United States Patent
Katayama

(10) Patent No.: US 7,000,476 B2
(45) Date of Patent: *Feb. 21, 2006

(54) INCLINATION ANGLE MEASUREMENT APPARATUS

(75) Inventor: Yoshio Katayama, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 10/359,192

(22) Filed: Feb. 6, 2003

(65) Prior Publication Data

US 2003/0154792 A1    Aug. 21, 2003

(30) Foreign Application Priority Data

Feb. 15, 2002  (JP) ............................. 2002-038808
Oct. 28, 2002  (JP) ............................. 2002-313126

(51) Int. Cl.
G01S 15/88    (2006.01)
(52) U.S. Cl. ........................ 73/627; 73/432.1; 367/125
(58) Field of Classification Search .................. 73/597, 73/602, 627, 628, 646, 432.1; 367/96, 99, 367/188, 87, 125; 342/61, 72; 315/82
See application file for complete search history.

(56) References Cited

U.S. PATENT DOCUMENTS

| 4,722,547 A | * | 2/1988 | Kishi et al. ..................... 367/96 |
| 4,868,720 A | * | 9/1989 | Miyauchi et al. ........... 362/466 |
| 5,475,620 A |   | 12/1995 | Kuzuya et al. |
| 5,907,196 A | * | 5/1999 | Hayami et al. ............. 307/10.8 |
| 6,130,506 A | * | 10/2000 | Lopez et al. ................... 315/82 |
| 6,714,483 B1 | * | 3/2004 | Minami et al. .............. 367/125 |
| 2003/0086077 A1 | * | 5/2003 | Kayano et al. ............. 356/121 |

FOREIGN PATENT DOCUMENTS

| JP | 56-8727 A | | 1/1981 |
| JP | 56-147006 A | | 11/1981 |
| JP | 58218295 A | * | 12/1983 |
| JP | 59-203973 A | | 11/1984 |
| JP | 61172080 A | * | 8/1986 |
| JP | 61-260113 A | | 11/1986 |
| JP | 02-5012 U | | 1/1990 |
| JP | 03072287 A | * | 3/1991 |
| JP | 04-151508 A | | 5/1992 |
| JP | 06-72740 U | | 10/1994 |
| JP | 06-331740 A | | 12/1994 |
| JP | 10181428 A | * | 7/1998 |
| JP | 2002-313126 A | | 10/2002 |

OTHER PUBLICATIONS

English Abstract, abstracting JP 56-8727 dated Jan. 29, 1981.
Patent Abstracts of Japan, abstracting JP-A-56-147006 dated Nov. 14, 1981.
Patent Abstracts of Japan, abstracting JP-A-59-203973 dated Nov. 19, 1984.
Patent Abstracts of Japan, abstracting JP-A-61-2601.13 dated Nov. 18, 1986.

(Continued)

Primary Examiner—John E. Chapman
Assistant Examiner—Rose M. Miller
(74) Attorney, Agent, or Firm—Sughrue Mion, PLLC

(57) ABSTRACT

An inclination angle measurement apparatus includes a first ultrasonic sensor (3) for sending an ultrasonic wave toward a reflective object (2), second and third ultrasonic sensors (4 and 5) each for receiving an ultrasonic wave reflected from the reflective object (2), and a calculation control circuit (14) for calculating an angle of inclination of a moving object with respect to the reflective object (2) based on a phase difference between ultrasonic waves received by the second and third ultrasonic sensors (4 and 5). Thus the inclination angle measurement apparatus can accurately measure the angle of inclination of the moving object with respect to the reflective object (2).

1 Claim, 28 Drawing Sheets

OTHER PUBLICATIONS

English-language translation of JP-U H02-5012 dated Jan. 12, 1990.

Patent Abstracts of Japan, abstracting JP-A-04-151508 dated May 25, 1992.

English-language translation of JP-U H06-72740 dated Oct. 11, 1994.

English Abstract, abstracting JP-A-2002-313126 dated Oct. 25, 2002.

* cited by examiner

ROAD SURFACE

ROAD SURFACE

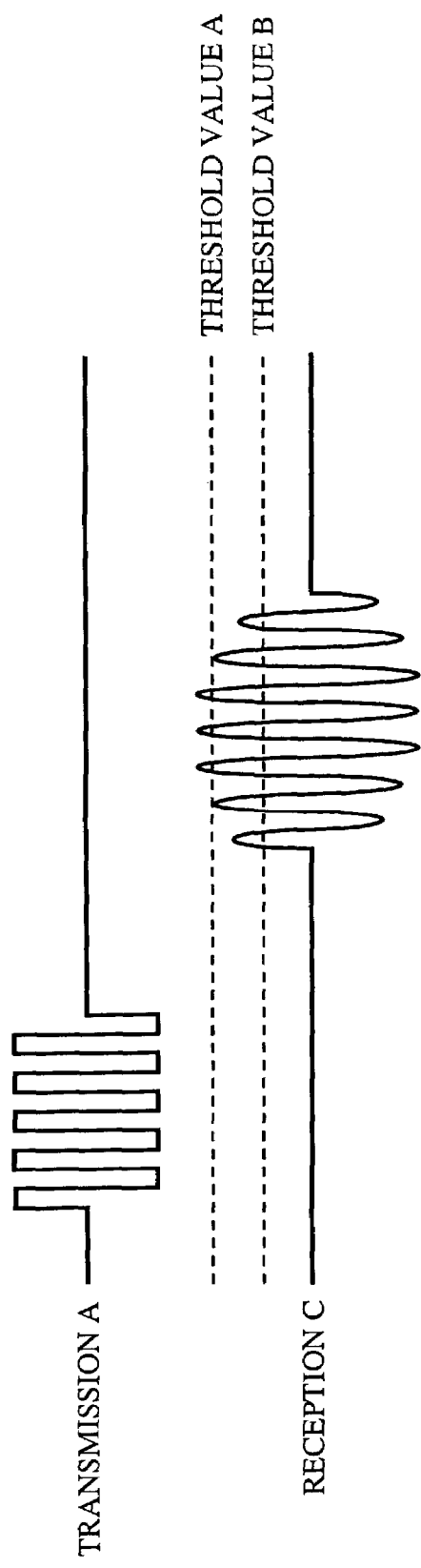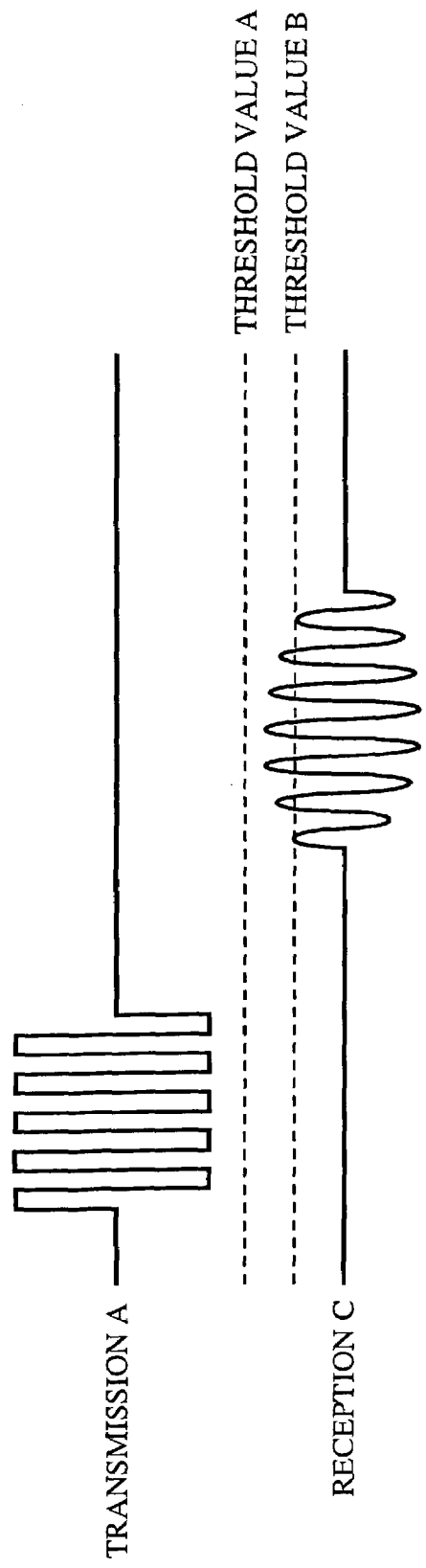

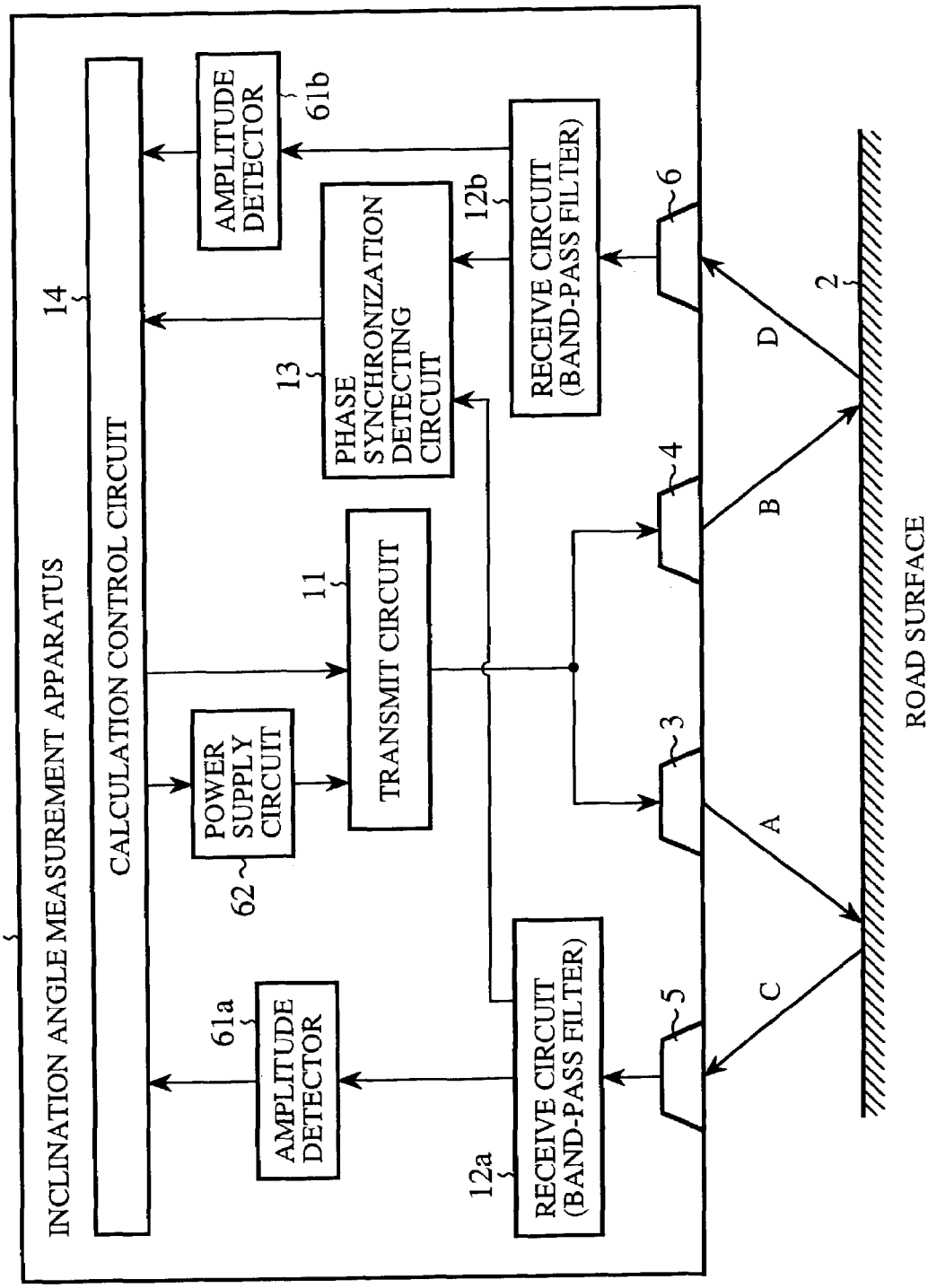

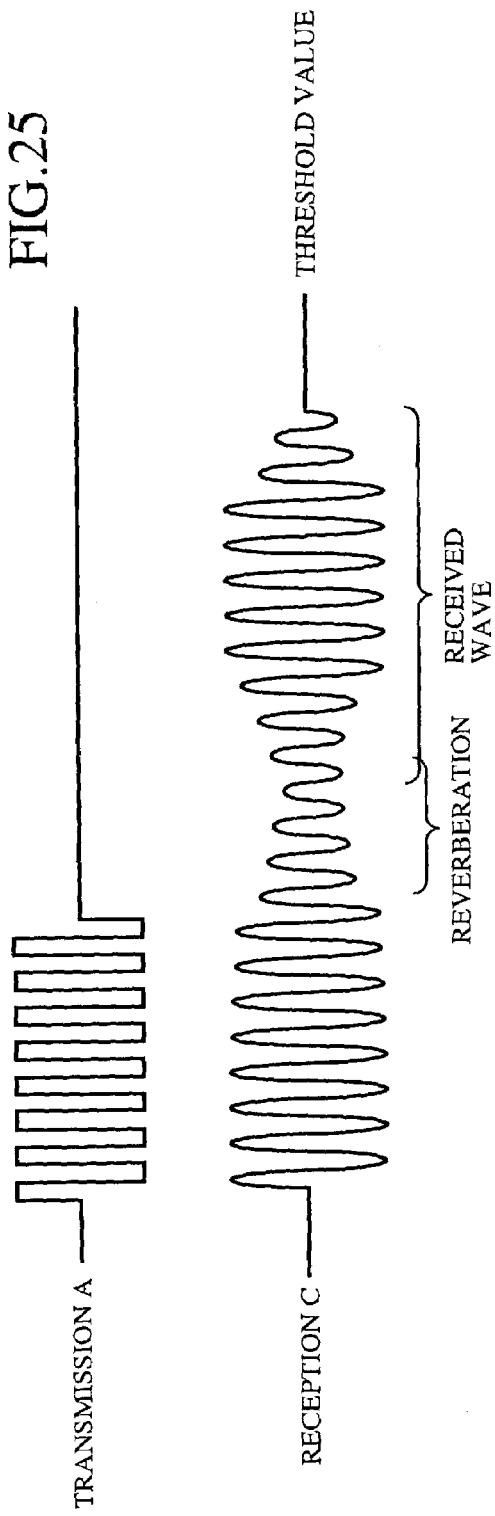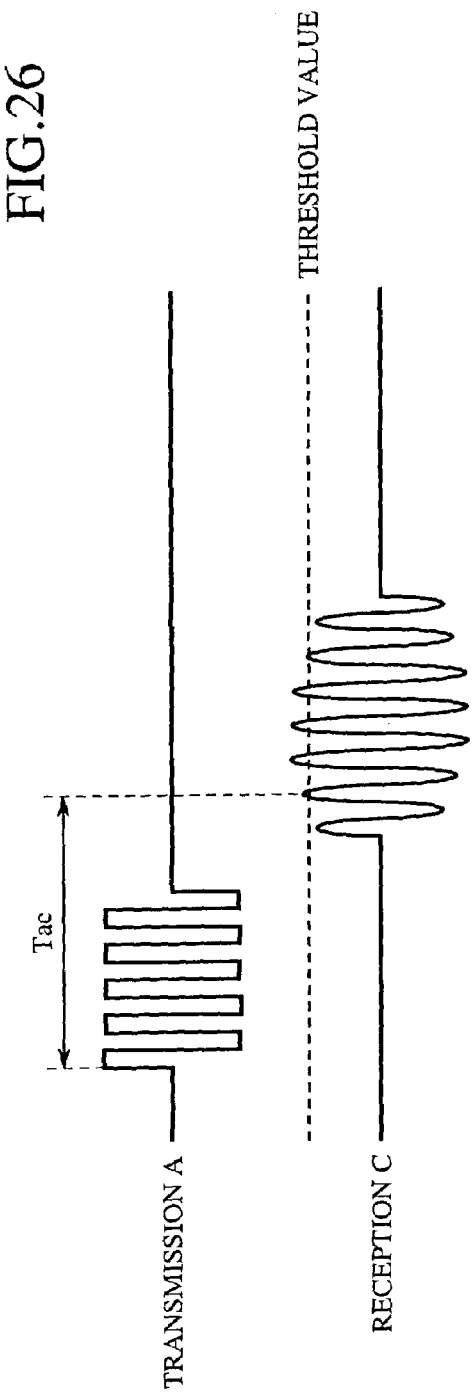

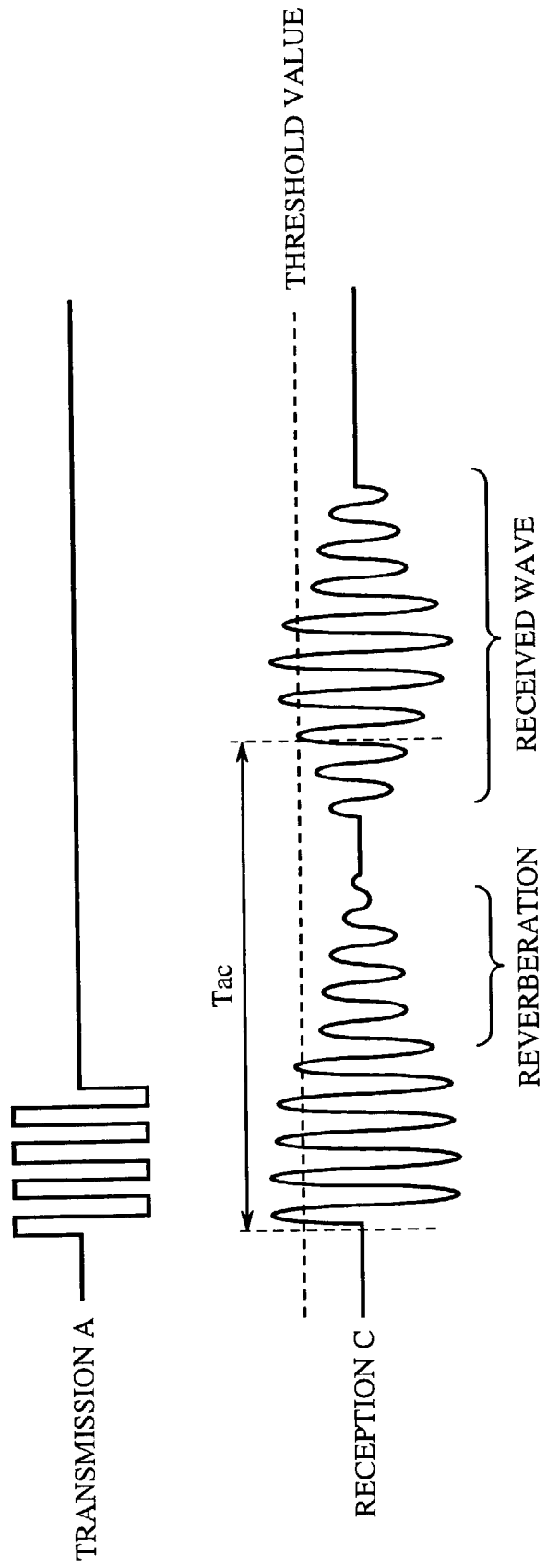

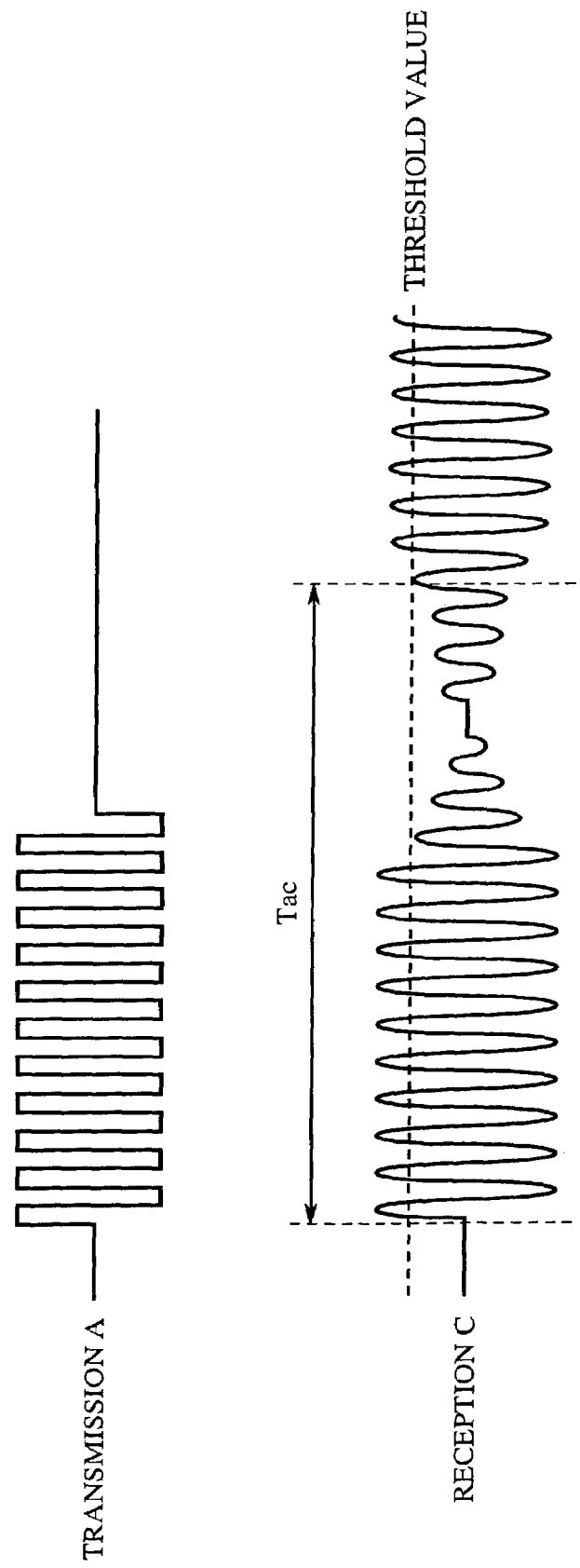

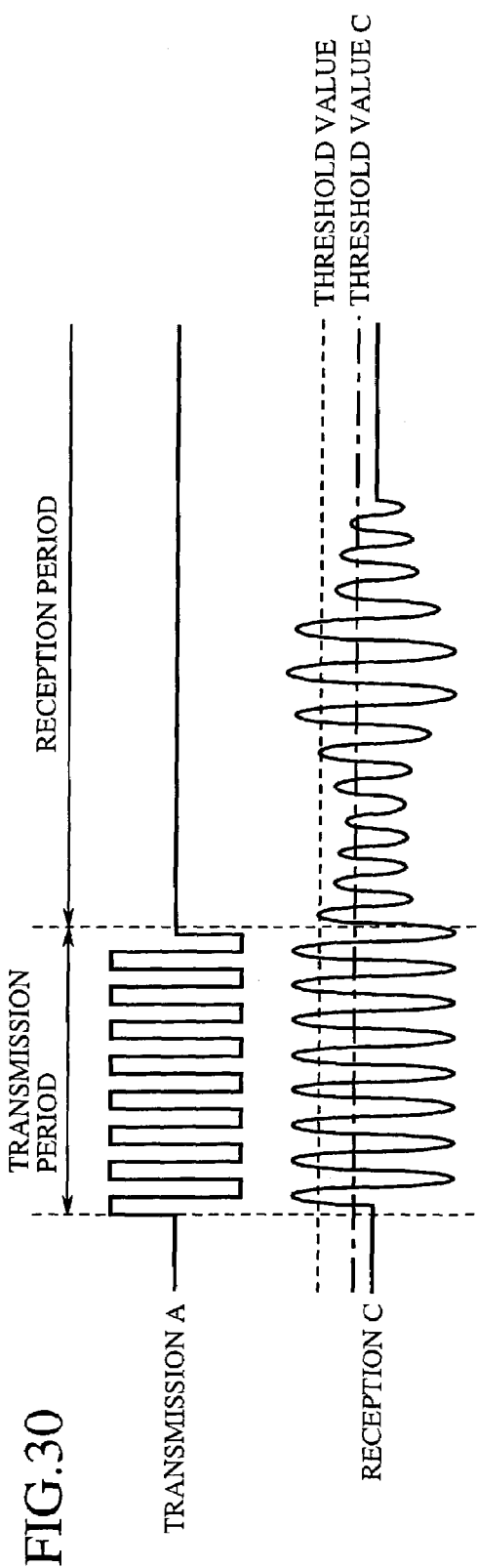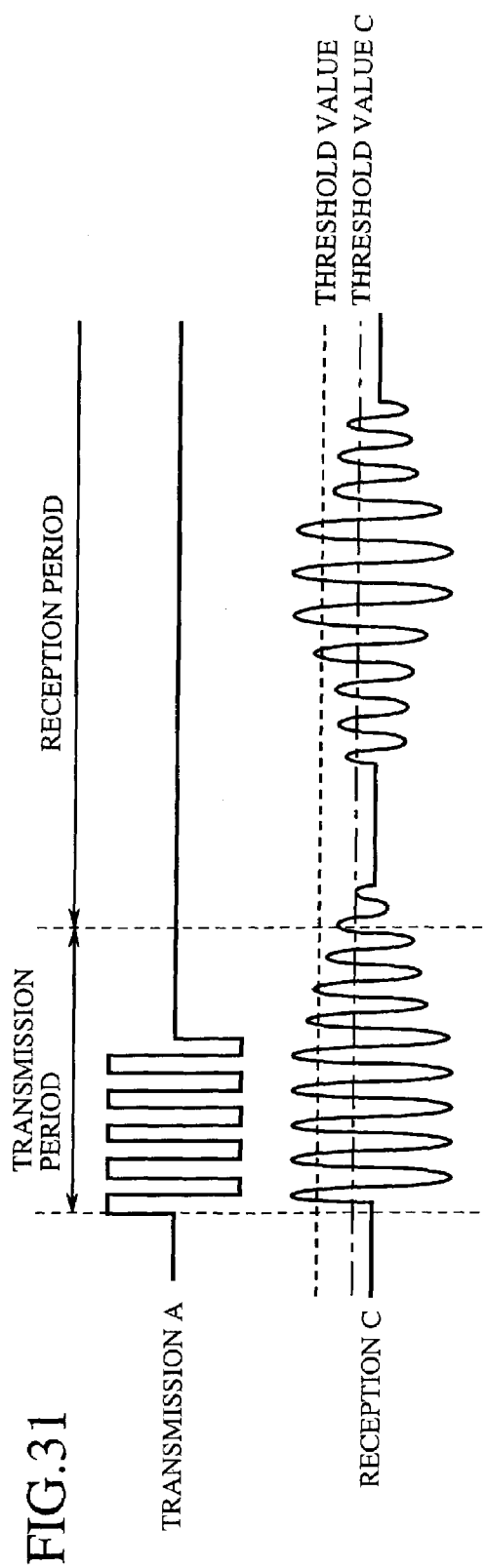

REFLECTED WAVE A
REFLECTED WAVE B
DIFFERENCE
ROAD SURFACE

REFLECTED WAVE A

REFLECTED WAVE B

RECEIVED WAVE

ROAD SURFACE

INCLINATION ANGLE MEASUREMENT APPARATUS

BACKGROUND OF THE INVENTION

1. Field of the Invention

The present invention relates to an inclination angle measurement apparatus that sends a wave toward a reflective object, such as a road surface, and measures an angle of inclination of a moving object (referred to as a vehicle from here on), such as a vehicle, aircraft, and magnetically-levitated linear motor car, with respect to the reflective object based on a phase difference between the phases of received waves reflected from the reflective object.

2. Description of Related Art

A prior art inclination angle measurement apparatus for measuring an angle of inclination of a vehicle is provided with two sensors disposed along the length of the vehicle, for simultaneously sending two ultrasonic waves toward a road surface, respectively, and for receiving ultrasonic waves reflected from the road surface, respectively so as to measure the angle of inclination of the vehicle with respect to the road surface based on a time difference between the times when the two sensors receive the ultrasonic waves reflected from the road surface (see Japanese patent application publication (TOKKAISHO) No. 56-8727).

A problem encountered with a prior art inclination angle measurement apparatus that is so constructed as to measure an angle of inclination of a vehicle with respect to a road surface based on a time difference between the times when two sensors receive ultrasonic waves reflected from the road surface is that because each received ultrasonic wave has small energy immediately after entering each of the two sensors and rises slowly in amplitude, the prior art inclination angle measurement apparatus cannot accurately detect the incident timing of the head of each of the two received ultrasonic waves. Therefore the prior art inclination angle measurement apparatus cannot accurately detect the time difference between the times when the two sensors receive the ultrasonic waves reflected from the road surface and cannot accurately measure the angle of inclination of the vehicle with respect to the road surface.

SUMMARY OF THE INVENTION

The present invention is proposed to solve the above-mentioned problem, and it is therefore an object of the present invention to provide an inclination angle measurement apparatus that can accurately measure an angle of inclination of a vehicle with respect to an object based on a phase difference between the phases of received waves.

In accordance with the present invention, there is provided an inclination angle measurement apparatus including a sending/receiving unit for sending a wave toward a reflective object and for receiving two waves reflected from the reflective object, and an inclination angle calculating unit for calculating an angle of inclination of a moving object with respect to the reflective object based on a phase difference between the phases of the two reflected waves.

As a result, the inclination angle measurement apparatus in accordance with the present invention can accurately measure the angle of inclination of the moving object with respect to the reflective object based on the phase difference between the received waves.

Further reflective objects and advantages of the present invention will be apparent from the following description of the preferred embodiments of the invention as illustrated in the accompanying drawings.

BRIEF DESCRIPTION OF THE DRAWINGS

FIGS. 21 to 23 are explanatory drawings each showing the amplitude of a received ultrasonic wave as compared with the amplitude of an ultrasonic wave sent toward a road surface;

FIG. 24 is a block diagram showing the structure of an inclination angle measurement apparatus according to embodiment 7 of the present invention;

FIGS. 25 to 28 are explanatory drawings each showing the amplitude of a received ultrasonic wave as compared with the amplitude of an ultrasonic wave sent toward a road surface;

FIGS. 30 to 31 are explanatory drawings for showing the amplitude of a received ultrasonic wave as compared with the amplitude of an ultrasonic wave sent toward a road surface in an inclination angle measurement apparatus according to embodiment 8 of the present invention;

DETAILED DESCRIPTION OF THE PREFERRED EMBODIMENTS

The invention will now be described with reference to the accompanying drawings.

Embodiment 1.

Figure 1:
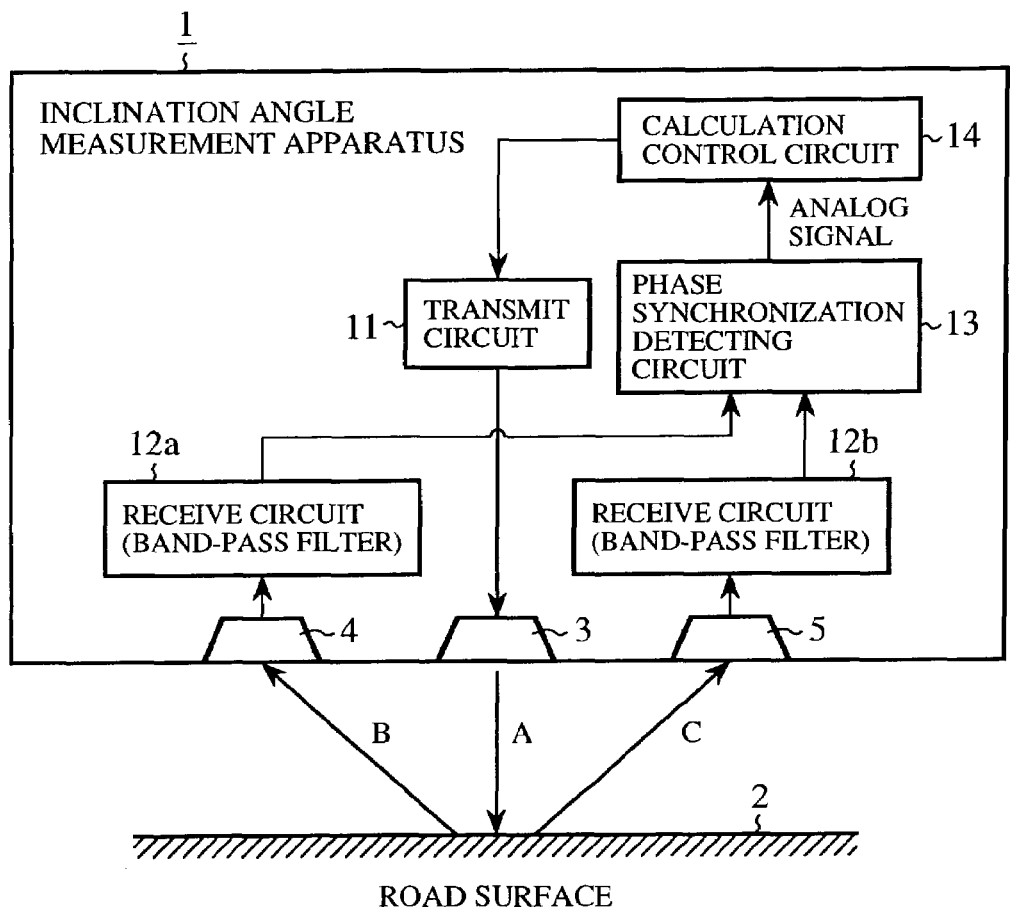
FIG. 1 is a block diagram showing the structure of an inclination angle measurement apparatus according to embodiment 1 of the present invention.

FIG. 1 is a block diagram showing an inclination angle measurement apparatus according to embodiment 1 of the present invention. In the figure, reference numeral 1 denotes the inclination angle measurement apparatus that is mounted on a lower surface of a moving object (referred to as a vehicle from here on) so that it is parallel to the lower surface of the vehicle, and reference numeral 2 denotes a road surface.

Figure 2:
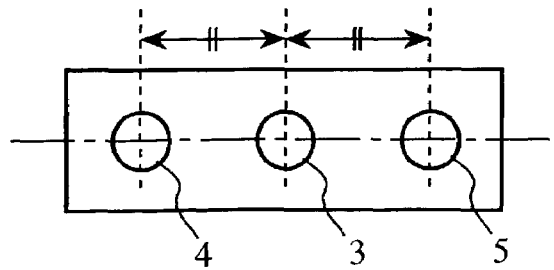
FIG. 2 is a bottom plan view of the inclination angle measurement apparatus according to embodiment 1 and shows the placement of ultrasonic sensors.

FIG. 2 is a bottom plan view of the inclination angle measurement apparatus and shows the placement of first to third ultrasonic sensors 3 to 5 included in the inclination angle measurement apparatus. Each of these ultrasonic sensors 3 to 5 can convert an electric fixed-frequency pulse train into an ultrasonic wave, and vice versa. In other words, each of these ultrasonic sensors 3 to 5 can send and receive an ultrasonic wave. In accordance with this embodiment 1, the first ultrasonic sensor 3 serves as an ultrasonic sensor for sending an ultrasonic wave toward the road surface 2, and each of the second and third ultrasonic sensors 4 and 5 serves as an ultrasonic sensor for receiving an ultrasonic wave reflected from the road surface 2. The first to third ultrasonic sensors 3 to 5 are arranged in a line along the length of the vehicle and are spaced at regular intervals.

In FIG. 1, reference numeral 11 denotes a transmit circuit for generating a fixed-frequency pulse train and for delivering it to the first ultrasonic sensor 3, reference numerals 12a and 12b denote receive circuits (band-pass filters) for respectively extracting fixed-frequency components from electric pulse trains that are generated from ultrasonic waves reflected from the road surface 2 by the second and third ultrasonic sensors 4 and 5, reference numeral 13 denotes a phase synchronization detecting circuit for comparing the waves of the fixed-frequency components extracted by the receive circuits 12a and 12b with each other so as to generate a phase difference between the fixed-frequency components, and reference numeral 14 denotes a calculation control circuit (inclination angle calculating means) for calculating an angle of inclination of the vehicle with respect to the road surface 2 based on the phase difference from the phase synchronization detecting circuit 13, and for controlling the entire inclination angle measurement apparatus 1.

Next, a description will be made as to an operation of the inclination angle measurement apparatus according to embodiment 1 of the present invention. The transmit circuit 11 shown in FIG. 1 generates a fixed-frequency pulse train according to an instruction from the calculation control circuit 14 and delivers it to the first ultrasonic sensor 3. The first ultrasonic sensor 3 converts the electric signal acquired from the transmit circuit 11 into vibrational energy so as to send an ultrasonic wave A toward the road surface 2.

The ultrasonic wave A hits the road surface 2 and is reflected from the road surface 2, and the second and third ultrasonic sensors 4 and 5 receive two ultrasonic waves B and C reflected from the road surface 2 and generate electric pulse signals having frequencies corresponding to the two ultrasonic waves B and C, respectively. The receive circuits 12a and 12b constitute band-pass filters, respectively, remove unnecessary frequency components from pulse trains generated by the second and third ultrasonic sensors 4 and 5, respectively, so as to extract only components having a frequency equal to that of the fixed-frequency pulse train used to generate the ultrasonic wave A, and transmit them to the phase synchronization detecting circuit 13, respectively. The phase synchronization detecting circuit 13 compares the waveforms of the fixed-frequency pulse trains respectively extracted by the receive circuit 12a and 12b with each other. The reflected ultrasonic wave that is received by each of the second and third ultrasonic sensors 4 and 5 immediately after starting receiving it has inadequate energy and a waveform of small amplitude. Therefore, the phase synchronization detecting circuit 13 may not be able to recognize the waveforms of the two reflected ultrasonic waves immediately after the second and third ultrasonic sensors 4 and 5 start receiving the two reflected ultrasonic waves, respectively. Therefore, after the two reflected ultrasonic waves have adequate signal levels, the phase synchronization detecting circuit 13 compares the waveforms of the fixed-frequency pulse trains respectively extracted by the receive circuit 12a and 12b with each other.

Because the second and third ultrasonic sensors 4 and 5 simultaneously receive the two ultrasonic waves B and C reflected from the road surface 2 when the vehicle is parallel to the road surface 2, the two ultrasonic waves B and C are in phase with each other. In contrast, when the vehicle's front side goes down toward the road surface 2, that is, when the vehicle's front side is inclined toward the road surface 2, the second ultrasonic sensor 4 receives the reflected ultrasonic wave B earlier than the ultrasonic sensor 5 receives the reflected ultrasonic wave C. In other words, the phase of the ultrasonic wave B received by the second ultrasonic sensor 4 leads the phase of the ultrasonic wave C received by the third ultrasonic sensor 5. Oppositely, when the vehicle's rear side goes down toward the road surface 2, that is, when the vehicle's rear side is inclined toward the road surface 2, the second ultrasonic sensor 4 receives the reflected wave B later than the third ultrasonic sensor 5 receives the reflected wave C. In other words, the phase of the ultrasonic wave B received by the second ultrasonic sensor 4 lags the phase of the ultrasonic wave C received by the third ultrasonic sensor 5. The phase synchronization detecting circuit 13 determines the phase difference between the phases of the ultrasonic waves B and C, converts this phase difference into an equivalent analog value, and delivers the analog value to the calculation control circuit 14. The calculation control circuit 14 calculates the angle of inclination of the vehicle with respect to the road surface 2 from the phase difference, the propagation velocity of the ultrasonic wave sent by the first ultrasonic sensor 3, the frequency of the ultrasonic wave, and the distance between the second ultrasonic sensor 4 and the third ultrasonic sensor 5. For example, the calculated inclination angle is used for adjustment (auto levelizer) of the optical axis of the headlight of the vehicle and control of the strength of the suspension of the vehicle.

Figure 3:
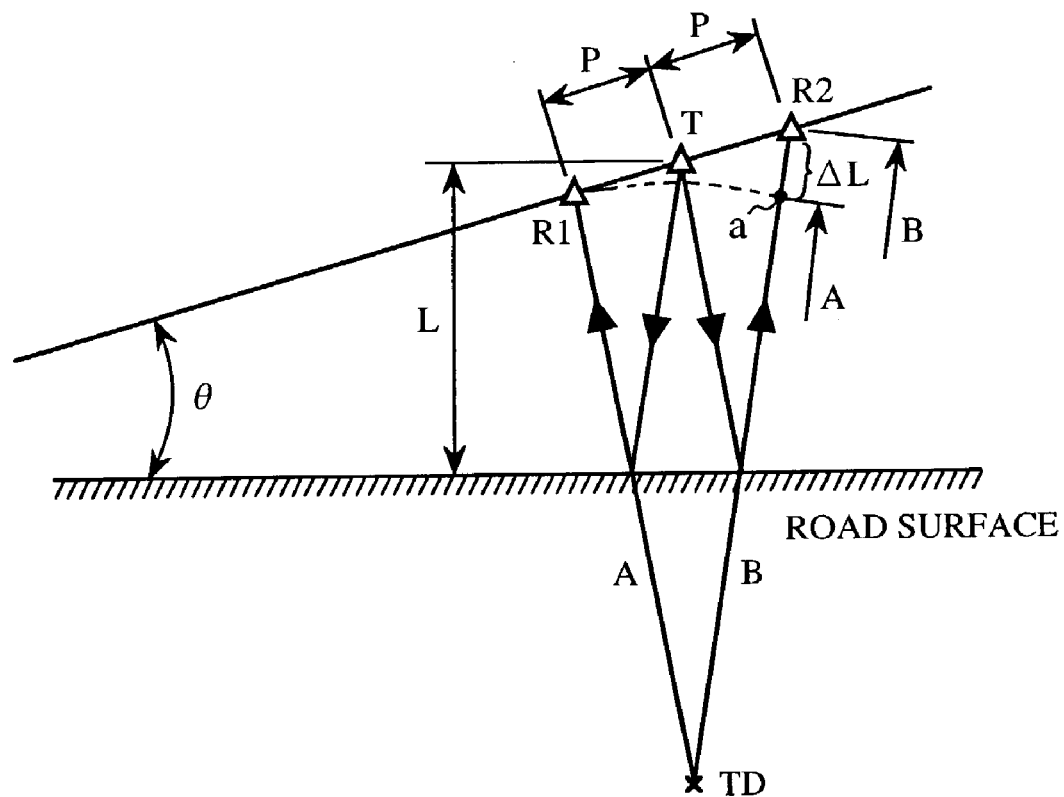
FIG. 3 is an explanatory drawing showing the principle of the inclination angle measurement apparatus according to embodiment 1 of the present invention.
Figure 4:
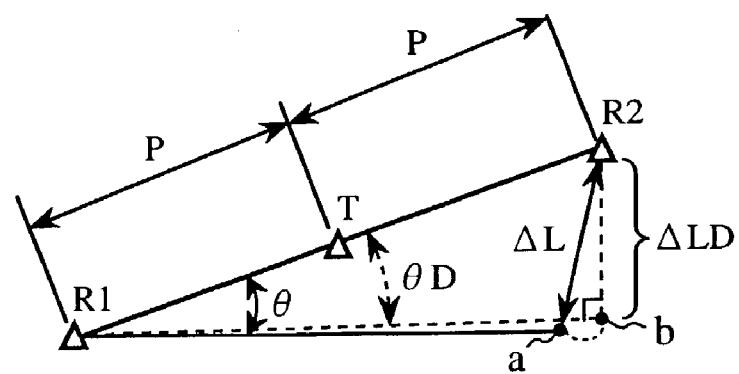
FIG. 4 is an explanatory drawing showing a part of FIG. 3 in detail.

Next, the principle underling the measurement of the angle of inclination by using the three ultrasonic sensors 3 to 5 will be explained. FIG. 3 is an explanatory drawing showing the principle of the inclination angle measurement apparatus according to embodiment 1 of the present invention. In the figure, T denotes a position of the first ultrasonic sensor 3 for sending an ultrasonic wave toward the road surface 2, R1 denotes a position of the second ultrasonic sensor 4 for receiving an ultrasonic wave reflected from the road surface 2, R2 denotes a position of the third ultrasonic sensor 5 for receiving an ultrasonic wave reflected from the road surface 2, TD denotes a virtual image point of the first ultrasonic sensor 3, A denotes the distance between R1 and TD, B denotes the distance between R2 and TD, a denotes a point having a distance from TD, which is equal to A, and located on the line segment between R2 and TD, ΔL denotes the length of a line segment between R2 and a, P denotes the distance (sensor pitch) between R1 and T and the distance (sensor pitch) between R2 and T, L denotes a height of the lower surface of the vehicle, θ denotes the angle of inclination of the lower surface of the vehicle with respect to the road surface. FIG. 4 is an explanatory drawing showing a part of FIG. 3 in detail.

If 2P>>ΔL, the triangle R1 ER2 Ea can be assumed to be congruent to the right-angled triangle R1 ER2 Eb, as can be seen from FIG. 4. Therefore, it can be assumed that the angle of inclination θ is equal to an angle θD formed by two sides at the vertex R1 of the right-angled triangle R1 ER2 Eb. The distance A is equivalent to the length of a path running from the position T to the position R1, along which the ultrasonic wave sent by the first ultrasonic sensor 3 travels to the second ultrasonic sensor 4, and the distance B is equivalent to the length of a path running from the position T to the position R2, along which the ultrasonic wave sent by the first ultrasonic sensor 3 travels to the third ultrasonic sensor 5. The difference between the distance B and the distance A, i.e., the distance ΔL is calculated from the phase difference delivered from the phase synchronization detecting circuit 13, the propagation velocity of the ultrasonic wave sent by the first ultrasonic sensor 3, and the frequency of the ultrasonic wave.

Therefore, sin θD is equal to ΔLD/2P, and it can be assumed that sin θ=ΔL/2P if 2P>>ΔL. Thus the angle of inclination θ can be calculated from the phase difference delivered from the phase synchronization detecting circuit 13, the propagation velocity of the ultrasonic wave sent by the first ultrasonic sensor 3, the frequency of the ultrasonic wave, and the sensor pitch.

As mentioned above, in accordance with this embodiment 1, the inclination angle measurement apparatus can accurately measure an angle of inclination of a vehicle with respect to a reflective object, such as a road surface, based on a phase difference between the phases of received ultrasonic waves by using the first ultrasonic sensor 3 for sending an ultrasonic wave toward the reflective object, and the second and third ultrasonic sensors 4 and 5 each for receiving an ultrasonic wave reflected from the reflective object.

Embodiment 2.

Figure 5:
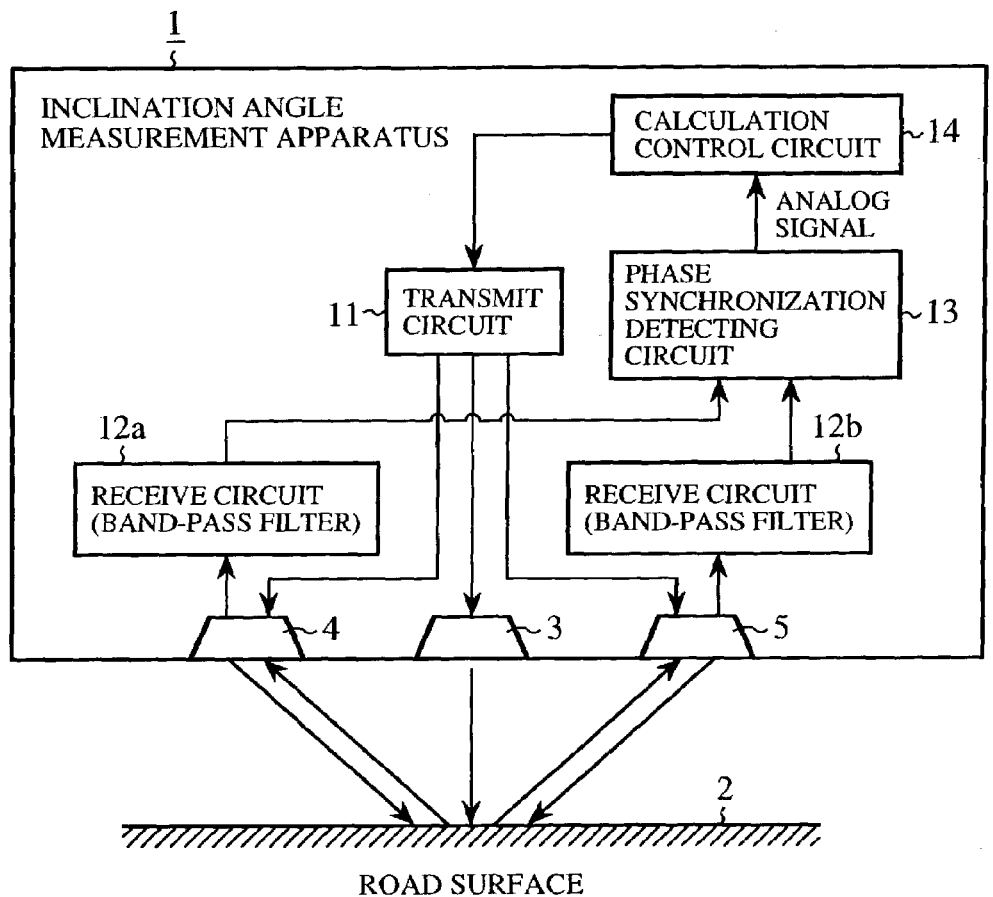
FIG. 5 is a block diagram showing the structure of an inclination angle measurement apparatus according to embodiment 2 of the present invention.

FIG. 5 is a block diagram showing the structure of an inclination angle measurement apparatus according to embodiment 2 of the present invention. In addition to a first ultrasonic sensor 3 for sending an ultrasonic wave toward a reflective object, such as a road surface, the inclination angle measurement apparatus according to embodiment 2 is provided with second and third ultrasonic sensors 4 and 5 each for sending an ultrasonic wave toward the reflective object, and for receiving an ultrasonic wave reflected from the reflective object, and a transmit circuit 11 for transmitting a fixed-frequency pulse train to the first to third ultrasonic sensors 3 to 5. The other components included in the inclination angle measurement apparatus according to embodiment 2 are the same as those of the inclination angle measurement apparatus according to embodiment 1 shown in FIG. 1, with the exception that a calculation control circuit 14 has a calculating function different from that of the calculation control circuit 14 of the inclination angle measurement apparatus according to embodiment 1.

Next, a description will be made as to an operation of the inclination angle measurement apparatus according to embodiment 2 of the present invention. As mentioned above, in accordance with above-mentioned embodiment 1, the inclination angle measurement apparatus measures an angle of inclination of a vehicle with respect to a reflective object, such as a road surface, based on a phase difference between the phases of received ultrasonic waves by using the first ultrasonic sensor 3 for sending an ultrasonic wave toward the reflective object, and the second and third ultrasonic sensors 4 and 5 each for receiving an ultrasonic wave reflected from the reflective object. However, when the vehicle is traveling and a wind is flowing between the three ultrasonic sensors 3 to 5 and the reflective object, there is a possibility that an error occurs in the calculated angle of inclination because the length of a path along which the ultrasonic wave actually travels from the first ultrasonic sensor 3 to the second ultrasonic sensor 4 differs from that of a path along which the ultrasonic wave actually travels from the first ultrasonic sensor 3 to the third ultrasonic sensor 5. The inclination angle measurement apparatus according to embodiment 2 makes a correction to an error that occurs in the calculated angle of inclination due to a wind flowing between the three ultrasonic sensors 3 to 5 and the reflective object or the like.

Figure 6:
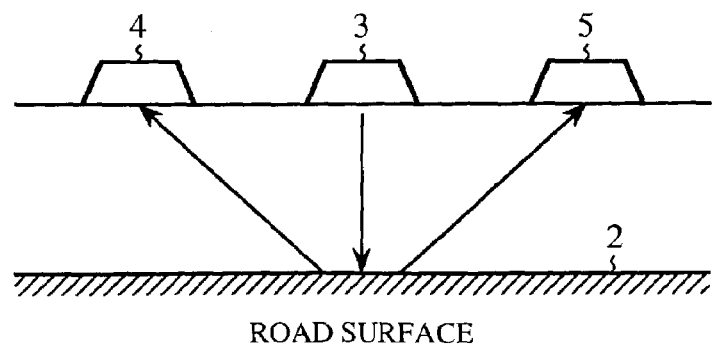
FIG. 6 is an explanatory drawing showing an operation of ultrasonic sensors of the inclination angle measurement apparatus according to embodiment 2 of the present invention.
Figure 7:
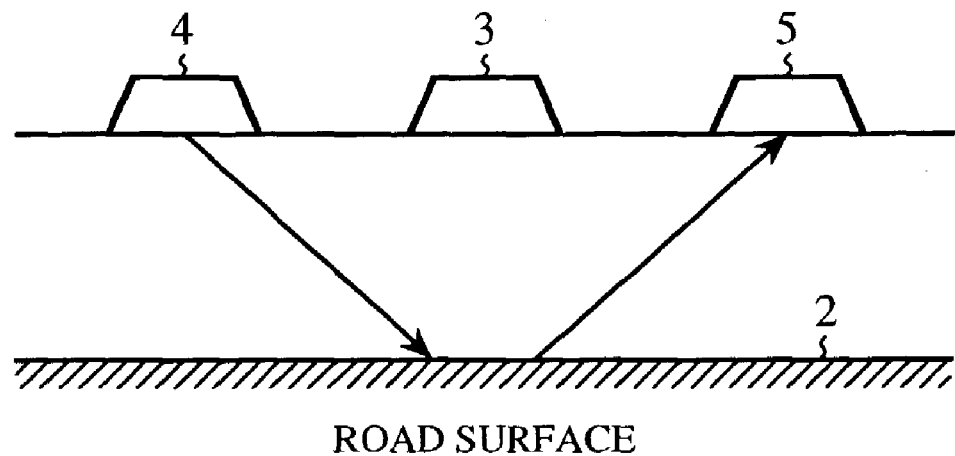
FIG. 7 is an explanatory drawing showing another operation of the ultrasonic sensors of the inclination angle measurement apparatus according to embodiment 2 of the present invention.
Figure 8:
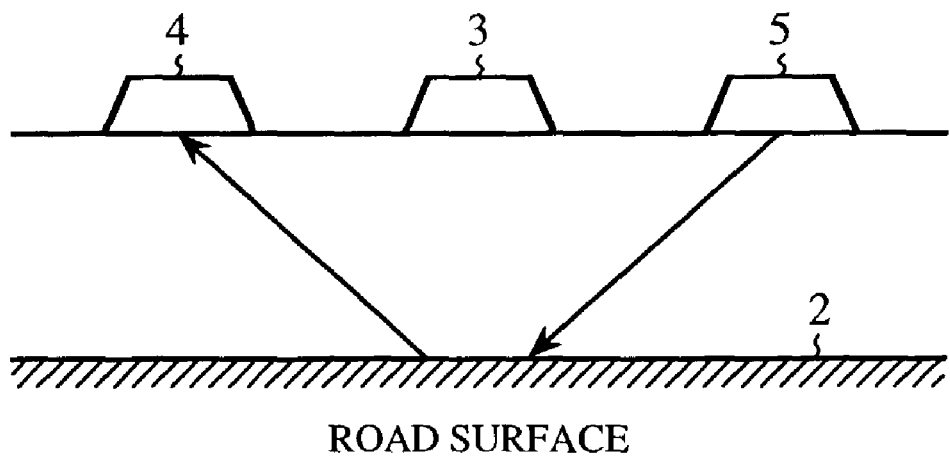
FIG. 8 is an explanatory drawing showing another operation of the ultrasonic sensors of the inclination angle measurement apparatus according to embodiment 2 of the present invention.

FIGS. 6 to 8 are explanatory drawings for showing operations of the three ultrasonic sensors 3 to 5 of the inclination angle measurement apparatus according to embodiment 2 of the present invention. First of all, the first ultrasonic sensor 3 sends an ultrasonic wave toward a road surface 2, as shown in FIG. 6. The second and third ultrasonic sensors 4 and 5 then receive two ultrasonic waves reflected from the road surface 2, and convert them into electric pulse trains, respectively. The second and third ultrasonic sensors 4 and 5 transmits them to a phase synchronization detecting circuit 13 by way of receive circuits 12a and 12b, respectively. The phase synchronization detecting circuit 13 then compares the waveforms of two fixed-frequency pulse trains respectively extracted by the receive circuits 12a and 12b with each other, and converts a phase difference between their phases into an equivalent analog value. The calculation control circuit 14 temporarily holds the phase difference.

Next, the second ultrasonic sensor 4 sends an ultrasonic wave toward the road surface 2, as shown in FIG. 7. The third ultrasonic sensor 5 then receives an ultrasonic wave reflected from the road surface 2, and converts it into an electric pulse train. The third ultrasonic sensor 5 transmits the electric pulse train to the calculation control circuit 14 by way of the second receive circuit 12b and the phase synchronization detecting circuit 13. The calculation control circuit 14 detects the phase of an input fixed-frequency pulse train based on an operation clock and temporarily holds it.

After that, the third ultrasonic sensor 5 sends an ultrasonic wave toward the road surface 2, as shown in FIG. 8. The second ultrasonic sensor 4 then receives an ultrasonic wave reflected from the road surface 2, and converts it into an electric pulse train. The second ultrasonic sensor 4 transmits the electric pulse train to the calculation control circuit 14 by way of the first receive circuit 12a and the phase synchronization detecting circuit 13. The calculation control circuit 14 detects the phase of an input fixed-frequency pulse train based on the operation clock and temporarily holds it.

Each of these processes as shown in FIGS. 6 to 8 is carried out within a short period of time during which wind conditions cannot change, e.g. 10 msec. The calculation control circuit 14 determines the phase difference between the phase detected during the process shown in FIG. 7 and the phase detected during the process shown in FIG. 8. A time corresponding to this phase difference is an error that occurs due to a wind flowing between the inclination angle measurement apparatus and the road surface, and that is included in the phase difference detected during the process shown in FIG. 6. Therefore, the calculation control circuit 14 subtracts the phase difference that corresponds to the error from the phase difference detected during the process shown in FIG. 6 so as to correct the phase difference detected during the process shown in FIG. 6, and calculates the angle of inclination of the vehicle with respect to the road surface 2 from the corrected phase difference, the propagation velocity of the ultrasonic wave sent by the first ultrasonic sensor 3, and the distance between the second ultrasonic sensor 4 and the third ultrasonic sensor 5.

As mentioned above, in accordance with this embodiment 2, the inclination angle measurement apparatus can accurately measure an angle of inclination of a vehicle with respect to a reflective object, such as a road surface, based on a phase difference between the phases of received ultrasonic waves by using the first ultrasonic sensor 3 for sending an ultrasonic wave toward the reflective object, and the second and third ultrasonic sensors 4 and 5 each for sending an ultrasonic wave toward the reflective object and for receiving an ultrasonic wave reflected from the reflective object.

Embodiment 3.

Figure 9:
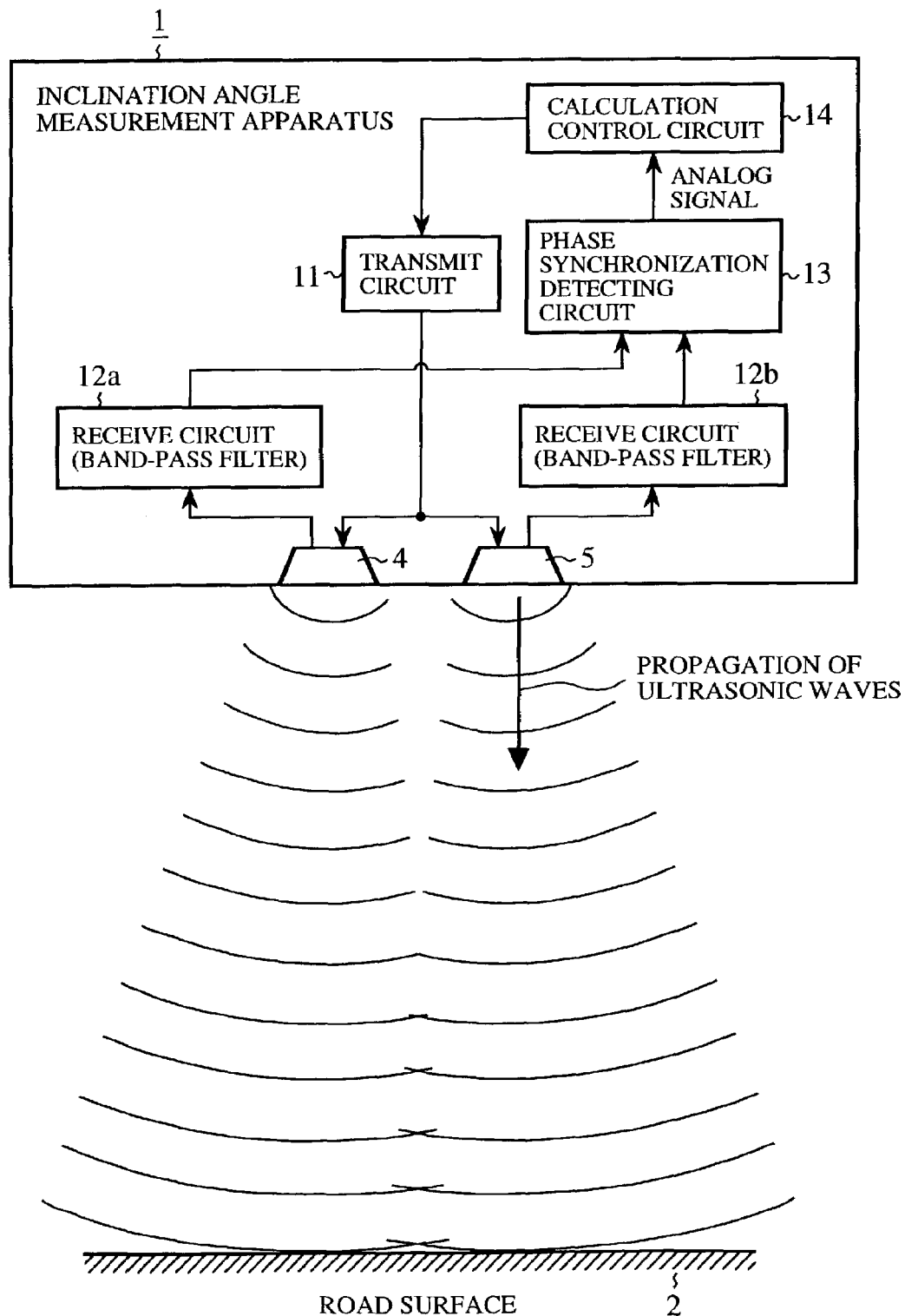
FIG. 9 is a block diagram showing the structure of an inclination angle measurement apparatus according to embodiment 3 of the present invention.

FIG. 9 is a block diagram showing the structure of an inclination angle measurement apparatus according to embodiment 3 of the present invention. The inclination angle measurement apparatus according to this embodiment 3 doesn't include an ultrasonic sensor 3, but includes ultrasonic sensors 4 and 5 each for sending an ultrasonic wave toward a reflective object, such as a road surface, and for receiving an ultrasonic wave reflected from the reflective object. The inclination angle measurement apparatus according to this embodiment 3 includes a transmit circuit 11 that is so constructed as to deliver a fixed-frequency pulse train to the first and second ultrasonic sensors 4 and 5. The first and second ultrasonic sensors 4 and 5 are arranged so that the distance between the first ultrasonic sensor 4 and the second ultrasonic sensor 5 is much shorter than the distance between each of the first and second ultrasonic sensors 4 and 5 and the reflective object. The other components included in the inclination angle measurement apparatus according to embodiment 3 are the same as those of the inclination angle measurement apparatus according to embodiment 1 shown in FIG. 1, with the exception that a calculation control circuit 14 sends an instruction for intermittently delivering a fixed-frequency pulse train to the first and second ultrasonic sensors 4 and 5 to the transmit circuit 11.

Next, a description will be made as to an operation of the inclination angle measurement apparatus according to embodiment 3 of the present invention. Unlike the inclination angle measurement apparatuses according to embodiments 1 and 2 of the present invention, the inclination angle measurement apparatus according to embodiment 3 of the present invention measures an angle of inclination of a vehicle by using the two ultrasonic sensors.

The calculation control circuit 14 of FIG. 9 transmits an instruction for intermittently delivering a fixed-frequency pulse train to the transmit circuit 11. This is because each of the first and second ultrasonic sensors 4 and 5 serves as an ultrasonic sensor for sending an ultrasonic wave toward a road surface 2 and for receiving an ultrasonic wave reflected from the road surface 2 and therefore each of them has to receive an ultrasonic wave reflected from the road surface 2 during an interval that each of them sends no ultrasonic wave toward the road surface 2. The transmit circuit 11 generates a fixed-frequency pulse train according to the instruction from the calculation control circuit 14 and delivers it to the first and second ultrasonic sensors 4 and 5. The first and second ultrasonic sensors 4 and 5 send in-phase ultrasonic waves toward the road surface 2, respectively.

Because the sensor pitch between the first ultrasonic sensor 4 and the second ultrasonic sensor 5 is much shorter than the distance between each of the first and second ultrasonic sensors 4 and 5 and the road surface 2, ultrasonic waves simultaneously emitted out of the first and second ultrasonic sensors 4 and 5 propagate and spread concentrically from the midpoint between the first ultrasonic sensor 4 and the second ultrasonic sensor 5. Therefore, it can be assumed that the in-phase ultrasonic waves simultaneously emitted out of the first and second ultrasonic sensors 4 and 5 are approximately equivalent to an ultrasonic wave emitted out of the midpoint between the first ultrasonic sensor 4 and the second ultrasonic sensor 5, i.e., an ultrasonic wave emitted out of the ultrasonic sensor 3 of the inclination angle measurement apparatus according to embodiment 1. As a result, the inclination angle measurement apparatus according to embodiment 1 can measure the angle of inclination of the vehicle with respect to the road surface 2 based on the same principle on which that according to embodiment 1 is based on.

As mentioned above, in accordance with this embodiment 3, the inclination angle measurement apparatus can accurately measure an angle of inclination of a vehicle with respect to a reflective object, such as a road surface, based on the phase difference between the phases of received ultrasonic waves while preventing errors from occurring due to a wind flowing between the inclination angle measurement apparatus and the reflective object, by using only the first and second ultrasonic sensors 4 and 5 each for sending an ultrasonic wave toward the reflective object and for receiving an ultrasonic wave reflected from the reflective object, i.e., by using a simple structure in which the ultrasonic sensor 3 for sending an ultrasonic wave toward the reflective object is omitted.

Embodiment 4.

Figure 10:
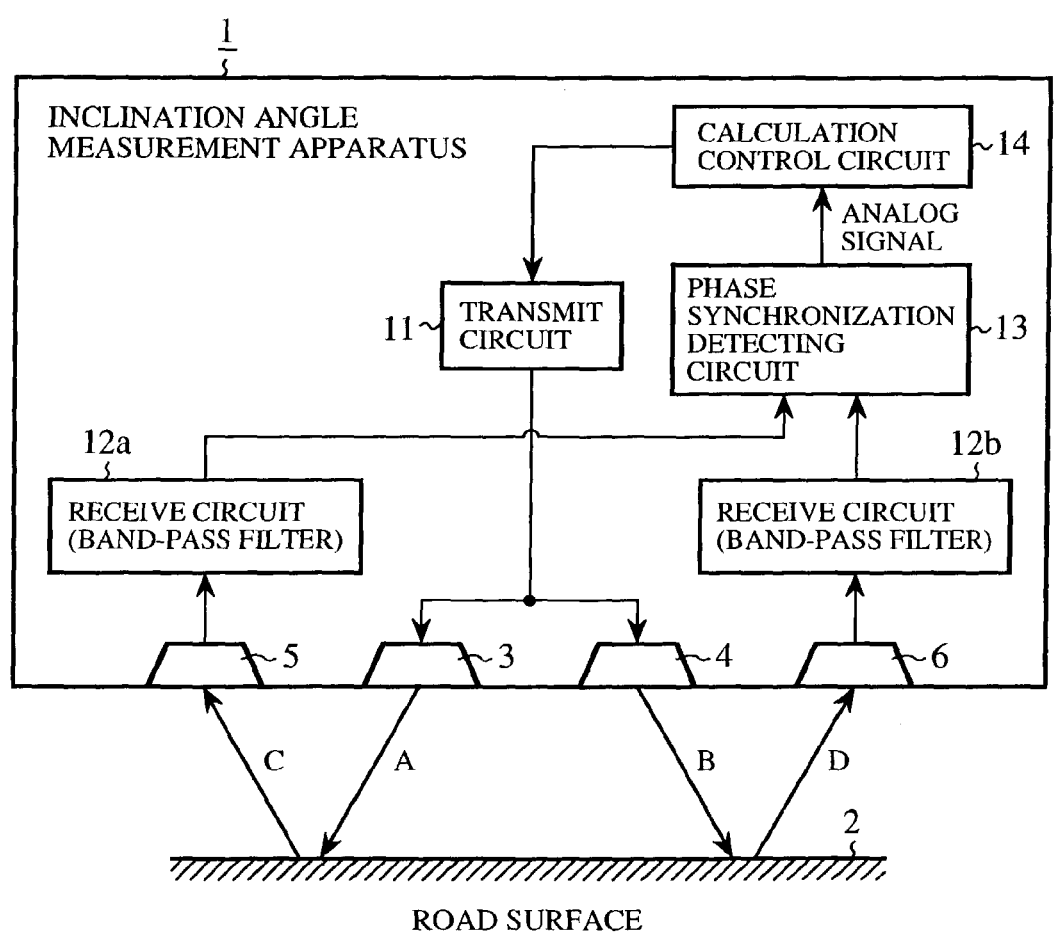
FIG. 10 is a block diagram showing the structure of an inclination angle measurement apparatus according to embodiment 4 of the present invention.

FIG. 10 is a block diagram showing the structure of an inclination angle measurement apparatus according to embodiment 4 of the present invention. The inclination angle measurement apparatus according to embodiment 4 is provided with first and second ultrasonic sensors 3, 4 each for sending an ultrasonic wave toward a reflective object such as a road surface, and third and fourth ultrasonic sensors 5 and 6 each for receiving an ultrasonic wave reflected from the reflective object. The inclination angle measurement apparatus according to embodiment 4 also includes a transmit circuit 11 that is so constructed as to deliver a fixed-frequency pulse train to the first and second ultrasonic sensors 3 and 4. A pulse train from the third ultrasonic sensor 5 is delivered to a first receive circuit 12a, and a pulse train from the fourth ultrasonic sensor 6 is delivered to a second receive circuit 12b. The ultrasonic sensors 3 to 6 are arranged so that the distance (sensor pitch) between the first and third ultrasonic sensors 3 and 5 is the same as the distance (sensor pitch) between the second and fourth ultrasonic sensors 4 and 6. The other components included in the inclination angle measurement apparatus according to embodiment 4 are the same as those of the inclination angle measurement apparatus according to embodiment 1 shown in FIG. 1, with the exception that a calculation control circuit 14 has a calculating function different from that of the calculation control circuit 14 of the inclination angle measurement apparatus according to embodiment 1.

Next, a description will be made as to an operation of the inclination angle measurement apparatus according to embodiment 4 of the present invention. The transmit circuit 11 of FIG. 10 generates a fixed-frequency pulse train according to an instruction from the calculation control circuit 14 and delivers it to the first and second ultrasonic sensors 3 and 4. The first and second ultrasonic sensors 3 and 4 convert the electric signal acquired from the transmit circuit 11 into vibrational energy so as to send two ultrasonic waves A and B toward a road surface 2, respectively.

The ultrasonic waves A and B hit the road surface 2 and are reflected from the road surface 2, and the third and fourth ultrasonic sensors 5 and 6 receive ultrasonic waves C and D reflected from the road surface 2 and generate electric pulse signals having frequencies corresponding to the received ultrasonic waves C and D, respectively. The third and fourth ultrasonic sensors 5 and 6 then transmit the electric pulse signals, by way of the first and second receive circuits 12a and 12b, to a phase synchronization detecting circuit 13, respectively. The phase synchronization detecting circuit 13 compares the waveforms of fixed-frequency pulse trains respectively extracted by the first and second receive circuit 12a and 12b with each other so as to determine a phase difference between the phases of the fixed-frequency pulse trains, converts the phase difference into an equivalent analog value, and delivers it to the calculation control circuit 14. The calculation control circuit 14 calculates the angle of inclination of the vehicle with respect to the road surface 2 from the phase difference, the propagation velocity of the ultrasonic waves sent by the first and second ultrasonic sensors 3 and 4, the frequency of the ultrasonic waves, and the distance between the first ultrasonic sensor 3 and the second ultrasonic sensor 4.

Figure 11:
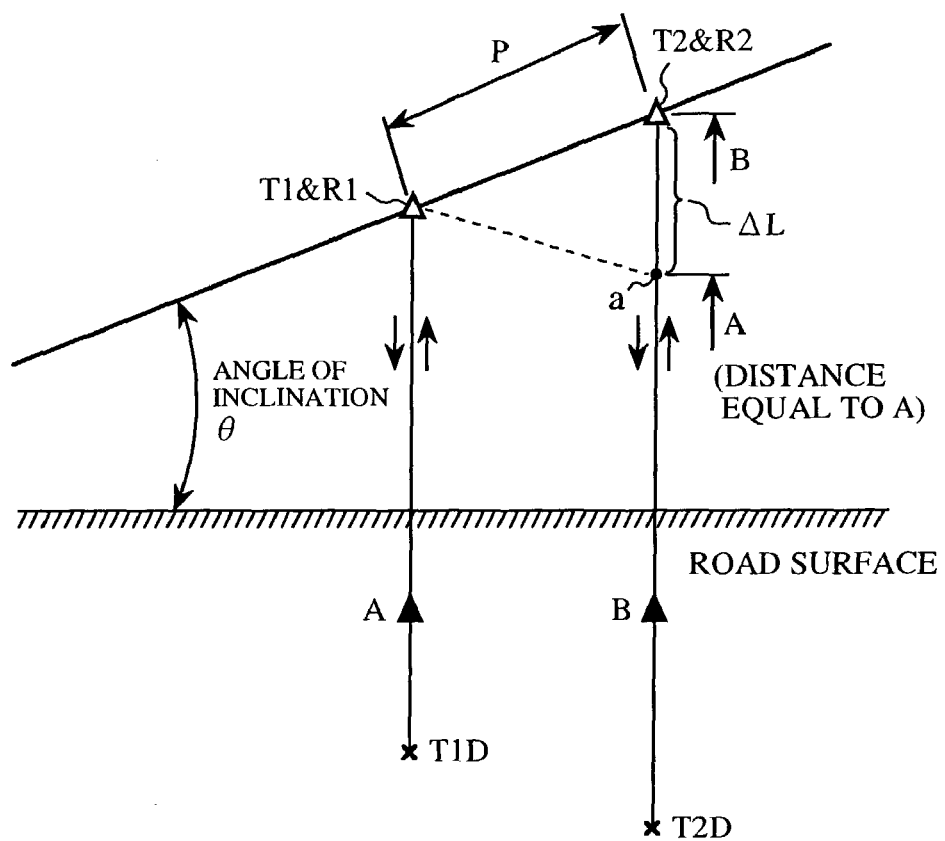
FIG. 11 is an explanatory drawing showing the principle of the inclination angle measurement apparatus according to embodiment 4 of the present invention.

Next, the principle underling the measurement of the angle of inclination by using the four ultrasonic sensors 3 to 6 will be explained. FIG. 11 is an explanatory drawing showing the principle of the inclination angle measurement apparatus according to embodiment 4 of the present invention. In the figure, T1&R1 denotes a position of the first and third ultrasonic sensors 3 and 5, and T2&R2 denotes a position of the second and fourth ultrasonic sensors 4 and 6.

Figure 12:
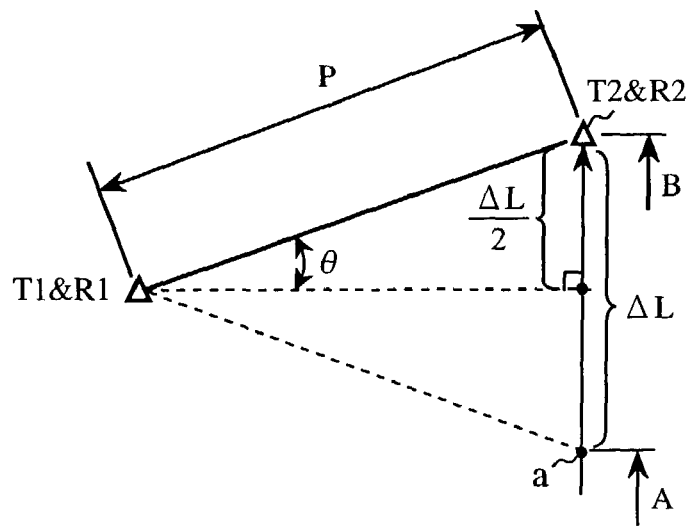
FIG. 12 is an explanatory drawing showing a part of FIG. 11 in detail.

Because the sensor pitch is much less than the distance between the road surface 2 and the four ultrasonic sensors 3 to 6, it can be assumed that the first and third ultrasonic sensors 3 and 5 actually located separately are placed at the same location and the second and fourth ultrasonic sensors 4 and 6 actually located separately are placed at the same location. T1D denotes a virtual image point of the first and third ultrasonic sensors 3 and 5, T2D denotes a virtual image point of the second and fourth ultrasonic sensors 4 and 6, A denotes the distance between T1&R1 and T1D, B denotes the distance between T2&R2 and T2D, a denotes a point having a distance from T2D that is equal to A, and located on a line segment between T2&R2 and T2D, $\Delta L$ denotes the length of a line segment between T2&R2 and a, P denotes the distance between T1&R1 and T2&R2, and $\theta$ denotes the angle of inclination of the lower surface of the vehicle with respect to the road surface. FIG. 12 is an explanatory drawing showing a part of FIG. 11 in detail.

The distance A is equivalent to the length of a path running from the position T1D to the position T1&R1, along which the ultrasonic wave sent by the first ultrasonic sensor 3 travels to the third ultrasonic sensor 5, and the distance B is equivalent to the length of a path running from the position T2D to the position T2&R2, along which the ultrasonic wave sent by the second ultrasonic sensor 4 travels to the fourth ultrasonic sensor 6. The difference between the distance B and the distance A, i.e., the distance $\Delta L$ is calculated from the phase difference delivered from the phase synchronization detecting circuit 13, the propagation velocity of the ultrasonic waves sent by the first and second ultrasonic sensors 3 and 4, and the frequency of the ultrasonic waves.

Therefore, it can be assumed that sin $\theta$32 ($\Delta L$/2)/P. Thus the angle of inclination $\theta$ can be calculated from the phase difference delivered from the phase synchronization detecting circuit 13, the propagation velocity of the ultrasonic waves sent by the first and second ultrasonic sensors 3 and 4, the frequency of the ultrasonic waves, and the distance P between T1&R1 and T2&R2.

In accordance with this embodiment 4, because when a wind flows between the four ultrasonic sensors 3 to 6 and the road surface 2, nearly the same influence is exerted on a path along which the ultrasonic wave emitted out of the first ultrasonic sensor 3 travels, by way of the road surface 2, to the third ultrasonic sensor 5, and a path along which the ultrasonic wave emitted out of the second ultrasonic sensor 4 travels, by way of the road surface 2, to the fourth ultrasonic sensor 6, the influence of the wind is cancelled during the detection of the phase difference between the phases of the two ultrasonic waves received by the third and fourth ultrasonic sensors 5 and 6 and no error occurs in the measurement results due to the influence of the wind.

As mentioned above, in accordance with this embodiment 4, the inclination angle measurement apparatus can accurately measure an angle of inclination of a vehicle with respect to a reflective object, such as a road surface, based on the phase difference between the phases of received ultrasonic waves while preventing errors from occurring due to a wind flowing between the inclination angle measurement apparatus and the reflective object, by using the first and second ultrasonic sensors 3 and 4 each for sending an ultrasonic wave toward the reflective object, and the third and fourth ultrasonic sensors 5 and 6 each for receiving an ultrasonic wave reflected from the reflective object.

Embodiment 5.

Figure 13:
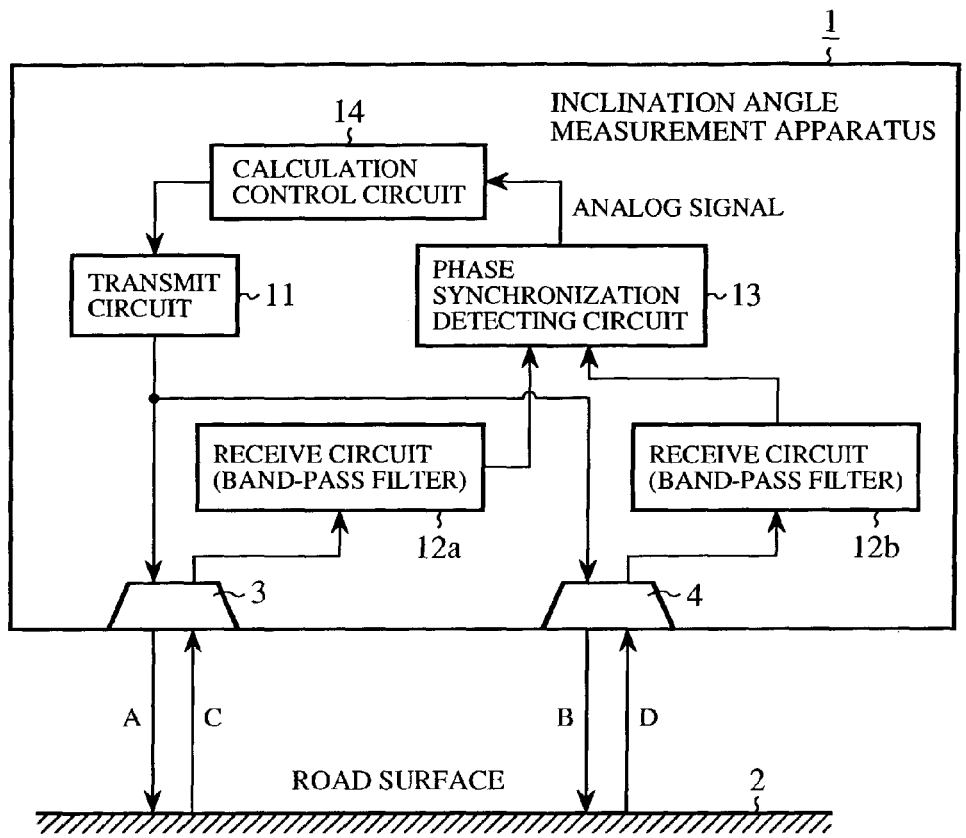
FIG. 13 is a block diagram showing the structure of an inclination angle measurement apparatus according to embodiment 5 of the present invention.
Figure 14:
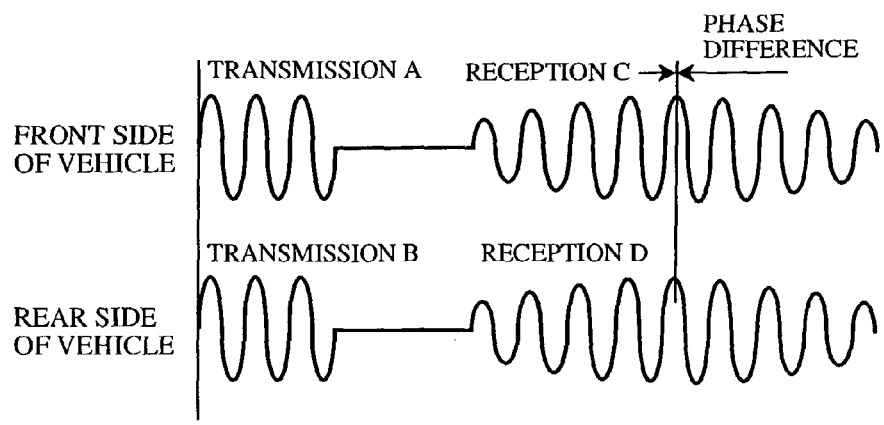
FIGS. 14 to 16 are explanatory drawings showing a relationship between the phases of two ultrasonic waves reflected from a road surface and the direction in which a vehicle is inclined with respect to the road surface.
Figure 15:
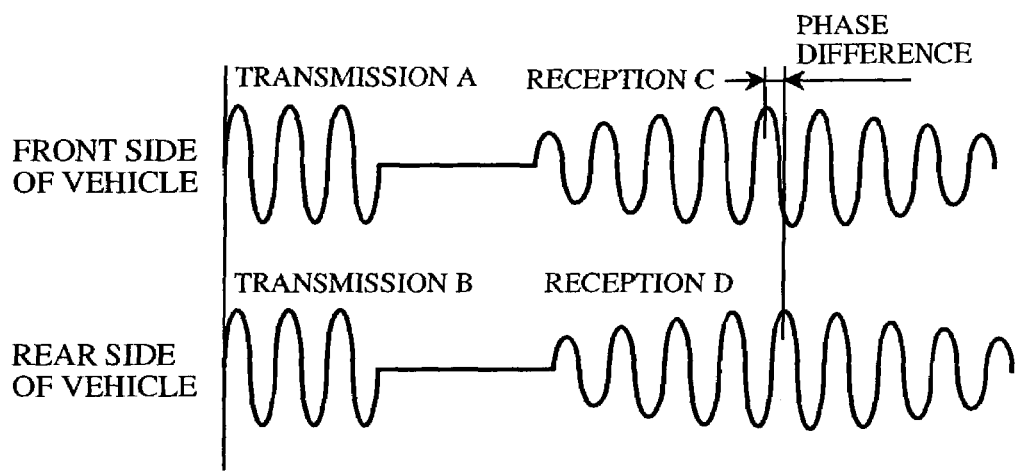
Figure 16:
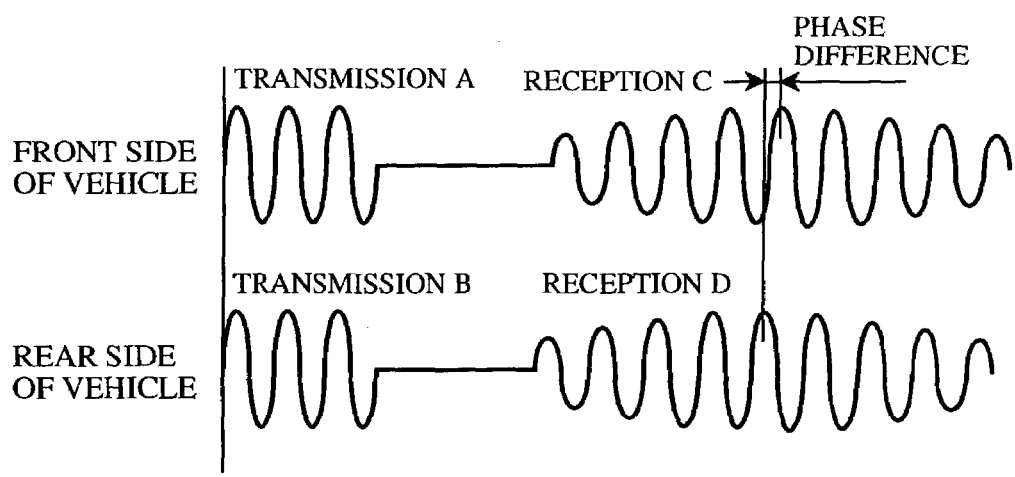

FIG. 13 is a block diagram showing the structure of an inclination angle measurement apparatus according to embodiment 5 of the present invention. The inclination angle measurement apparatus according to embodiment 5 is provided with two ultrasonic sensors 3 and 4 each for sending an ultrasonic wave toward a reflective object, such as a road surface 2, and for receiving an ultrasonic wave reflected from the reflective object, as shown in the figure. An electric pulse train from the first ultrasonic sensor 3 is delivered to a first receive circuit 12a, and an electric pulse train from the second ultrasonic sensor 4 is delivered to a second receive circuit 12b. The other components included in the inclination angle measurement apparatus according to embodiment 5 are the same as those of the inclination angle measurement apparatus according to embodiment 4 shown in FIG. 10, with the exception that a calculation control circuit 14 sends an instruction for intermittently delivering a fixed-frequency pulse train to the first and second ultrasonic sensors 3 and 4 to a transmit circuit 11.

Next, a description will be made as to an operation of the inclination angle measurement apparatus according to embodiment 5 of the present invention. The calculation control circuit 14 of FIG. 13 transmits an instruction for intermittently delivering a fixed-frequency pulse train to the first and second ultrasonic sensors 3 and 4 to the transmit circuit 11. This is because each of the first and second ultrasonic sensors 3 and 4 serves as an ultrasonic sensor for sending an ultrasonic wave toward a road surface 2 and for receiving an ultrasonic wave reflected from the road surface 2 and therefore each of them has to receive an ultrasonic wave reflected from the road surface 2 during an interval that each of them sends no ultrasonic wave toward the road surface 2. The transmit circuit 11 generates a fixed-frequency pulse train according to the instruction from the calculation control circuit 14 and delivers it to the first and second ultrasonic sensors 3 and 4. The first and second ultrasonic sensors 3 and 4 send in-phase ultrasonic waves A and C to the road surface 2, respectively.

The two ultrasonic waves A and C hit the road surface 2 and are reflected from the road surface 2, and the first and second ultrasonic sensors 3 and 4 receive two ultrasonic waves B and D reflected from the road surface 2 and generate electric pulse signals having frequencies corresponding to the ultrasonic waves B and D, respectively. The first and second ultrasonic sensors 3 and 4 then transmit them, by way of the receive circuits 12a and 12b, to a phase synchronization detecting circuit 13, respectively. The phase synchronization detecting circuit 13 compares the waveforms of fixed-frequency pulse trains respectively extracted by the receive circuit 12a and 12b with each other. The reflected ultrasonic wave that is received by each of the first and second ultrasonic sensors 3 and 4 immediately after starting receiving it has inadequate energy and a waveform of small amplitude. Therefore, the phase synchronization detecting circuit 13 may not be able to recognize the waveforms of the two reflected ultrasonic waves immediately after the first and second ultrasonic sensors 3 and 4 start receiving the two reflected ultrasonic waves. Therefore, after the two reflected ultrasonic waves have adequate signal levels, the phase synchronization detecting circuit 13 compares the waveforms of the fixed-frequency pulse trains respectively extracted by the receive circuit 12a and 12b with each other.

Because the first and second ultrasonic sensors 3 and 4 simultaneously receive the two ultrasonic waves C and D reflected from the road surface 2 when the vehicle is parallel to the road surface 2, the two ultrasonic waves C and D are in phase with each other. In contrast, when the vehicle's front side goes down toward the road surface 2, that is, when the vehicle's front side is inclined toward the road surface 2, the first ultrasonic sensor 3 receives the reflected wave C earlier than the second ultrasonic sensor 4 receives the reflected wave D. In other words, the phase of the ultrasonic wave C received by the first ultrasonic sensor 3 leads the phase of the ultrasonic wave D received by the second ultrasonic sensor 4. Oppositely, when the vehicle's rear side goes down toward the road surface 2, that is, when the vehicle's rear side is inclined toward the road surface 2, the first ultrasonic sensor 3 receives the reflected wave C later than the second ultrasonic sensor 4 receives the reflected wave D. In other words, the phase of the ultrasonic wave C received by the first ultrasonic sensor 3 lags the phase of the ultrasonic wave D received by the second ultrasonic sensor 4. The phase synchronization detecting circuit 13 acquires the phase difference between the phases of the ultrasonic waves C and D, converts this phase difference into an equivalent analog value, and delivers the analog value to the calculation control circuit 14. The calculation control circuit 14 calculates the angle of inclination of the vehicle with respect to the road surface 2 from the phase difference, the propagation velocity of the ultrasonic waves sent by the first and second ultrasonic sensors 3 and 4, the frequency of the ultrasonic waves, and the distance between the first and second ultrasonic sensors 3 and 4.

As mentioned above, in accordance with this embodiment 5, the inclination angle measurement apparatus can accurately measure an angle of inclination of a vehicle with respect to a reflective object, such as a road surface, based on the phase difference between the phases of received ultrasonic waves while preventing errors from occurring due to a wind flowing between the inclination angle measurement apparatus and the reflective object, by using only the first and second ultrasonic sensors 3 and 4 each for sending an ultrasonic wave toward the reflective object and for receiving an ultrasonic wave reflected from the reflective object, i.e., by using a simple structure in which two ultrasonic sensors for sending an ultrasonic wave toward the reflective object or receiving an ultrasonic wave reflected from the reflective object is omitted.

Embodiment 6.

Figure 17:
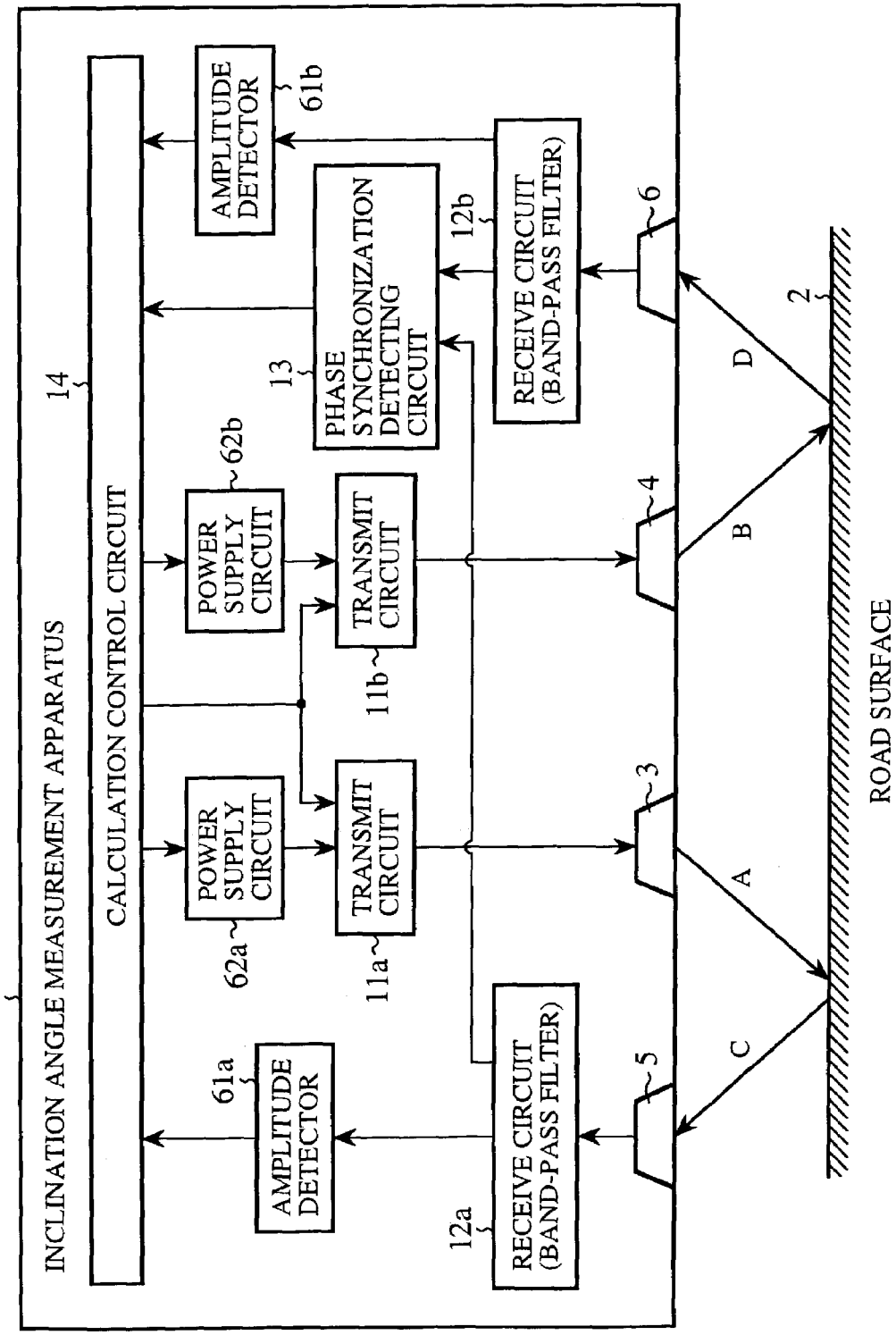
FIG. 17 is a block diagram showing the structure of an inclination angle measurement apparatus according to embodiment 6 of the present invention.

FIG. 17 is a block diagram showing the structure of an inclination angle measurement apparatus according to embodiment 6 of the present invention. In the figure, reference numerals 11*a* and 11*b* denote transmit circuits for generating and delivering fixed-frequency pulse trains to first and second ultrasonic sensors 3 and 4, respectively, reference numerals 61*a* and 61*b* denote amplitude detectors (amplitude detecting means) for detecting the amplitudes of received waves extracted by receive circuits 12*a* and 12*b*, respectively, and reference numerals 62*a* and 62*b* denote power supply circuits for supplying arbitrary voltages to the first and second transmit circuits 11*a* and 11*b* according to control signals from a calculation control circuit 14, respectively. The inclination angle measurement apparatus according to embodiment 6 of the present invention is so constructed as to adjust the amplitudes of the fixed-frequency pulse trains delivered from the first and second transmit circuits 11*a* and 11*b* by freely adjusting those voltages supplied from the first and second power supply circuits 62*a* and 62*b*. The other components included in the inclination angle measurement apparatus according to embodiment 6 are the same as those of the inclination angle measurement apparatus according to embodiment 4 shown in FIG. 10, with the exception that a calculation control circuit 14 has a calculating function different from that of the calculation control circuit 14 of the inclination angle measurement apparatus according to embodiment 4.

Figure 19:
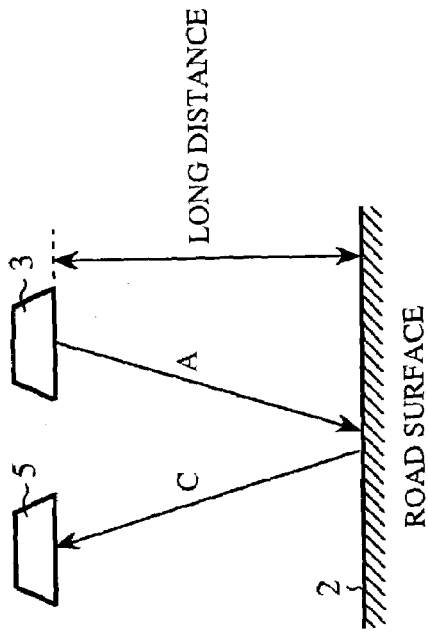
FIG. 19 is an explanatory drawing showing the first and third ultrasonic sensors of the inclination angle measurement apparatus according to embodiment 6 in a case where the distance between those ultrasonic sensors and the road surface is long.
Figure 18:
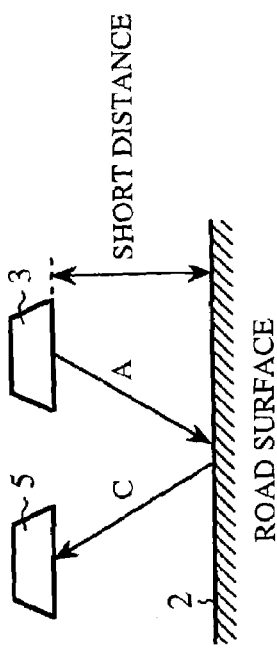
FIG. 18 is an explanatory drawing showing first and third ultrasonic sensors of the inclination angle measurement apparatus according to embodiment 6 in a case where the distance between those ultrasonic sensors and a road surface is short.

Next, a description will be made as to an operation of the inclination angle measurement apparatus according to embodiment 6 of the present invention. FIG. 18 is explanatory drawing showing a case where the distance between the first and third ultrasonic sensors 3 and 5 and a road surface 2 is short, and FIG. 19 is an explanatory drawing showing a case where the distance between the first and third ultrasonic sensors 3 and 5 and the road surface 2 is long.

When the distance between the first and third ultrasonic sensors 3 and 5 and the road surface 2 is short, as shown in FIG. 18, because the ultrasonic wave A sent by the first ultrasonic sensor 3 is received, as the ultrasonic wave C, by the third ultrasonic sensor 5 without being greatly attenuated, the ultrasonic wave C received by the third ultrasonic sensor 5 has a too large amplitude and therefore the first receive circuit 12*a* generates an electric signal having a saturated amplitude. As a result, there is a possibility that a large error occurs in the measured phases of the two received ultrasonic waves C and D and the phase difference between them or there is a possibility that each reflected ultrasonic wave is buried in a reverberation that lasts for a long time because each received ultrasonic wave has excessive electric power. In contrast, when the distance between the first and third ultrasonic sensors 3 and 5 and the road surface 2 is long, as shown in FIG. 19, because the ultrasonic wave A sent by the first ultrasonic sensor 3 is received, as the ultrasonic wave C, by the third ultrasonic sensor 5 after being attenuated, there is a possibility that the ultrasonic wave C received by the third ultrasonic sensor 5 has a too small amplitude and it is therefore impossible to measure the phases of the received ultrasonic waves C and D and the phase difference between them from fixed-frequency electric signals extracted by the first and second receive circuits 12*a* and 12*b*. Furthermore, there is a possibility that the reflected ultrasonic wave received by each of the third and fourth ultrasonic sensors 5 and 6 does not have an enough strength because the ultrasonic wave is attenuated due to the roughness or softness of the road surface 2 when reflected from the road surface 2.

The calculation control circuit 14 shown in FIG. 17 delivers a control signal to the first and second power circuit 62*a* and 62*b* so that electric signals sent by the fist and second receive circuits 12*a* and 12*b* and detected by the amplitude detecting circuits 61*a* and 61*b* have an amplitude that falls within a predetermined range, and adjusts the amplitudes of the ultrasonic waves generated by the first and second ultrasonic sensors 3 and 4 through the first and second transmit circuits 11*a* and 11*b*, respectively.

Figure 21:
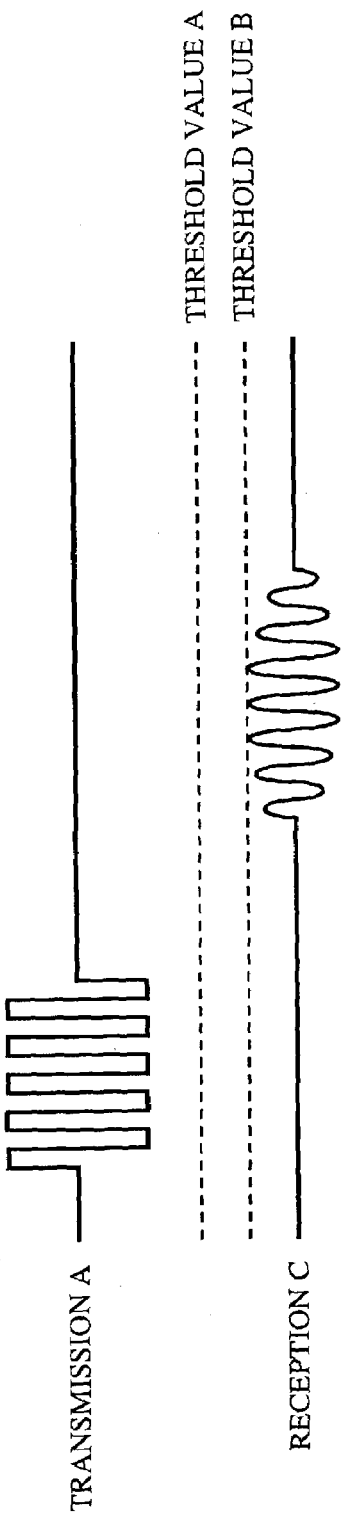
Figure 20:
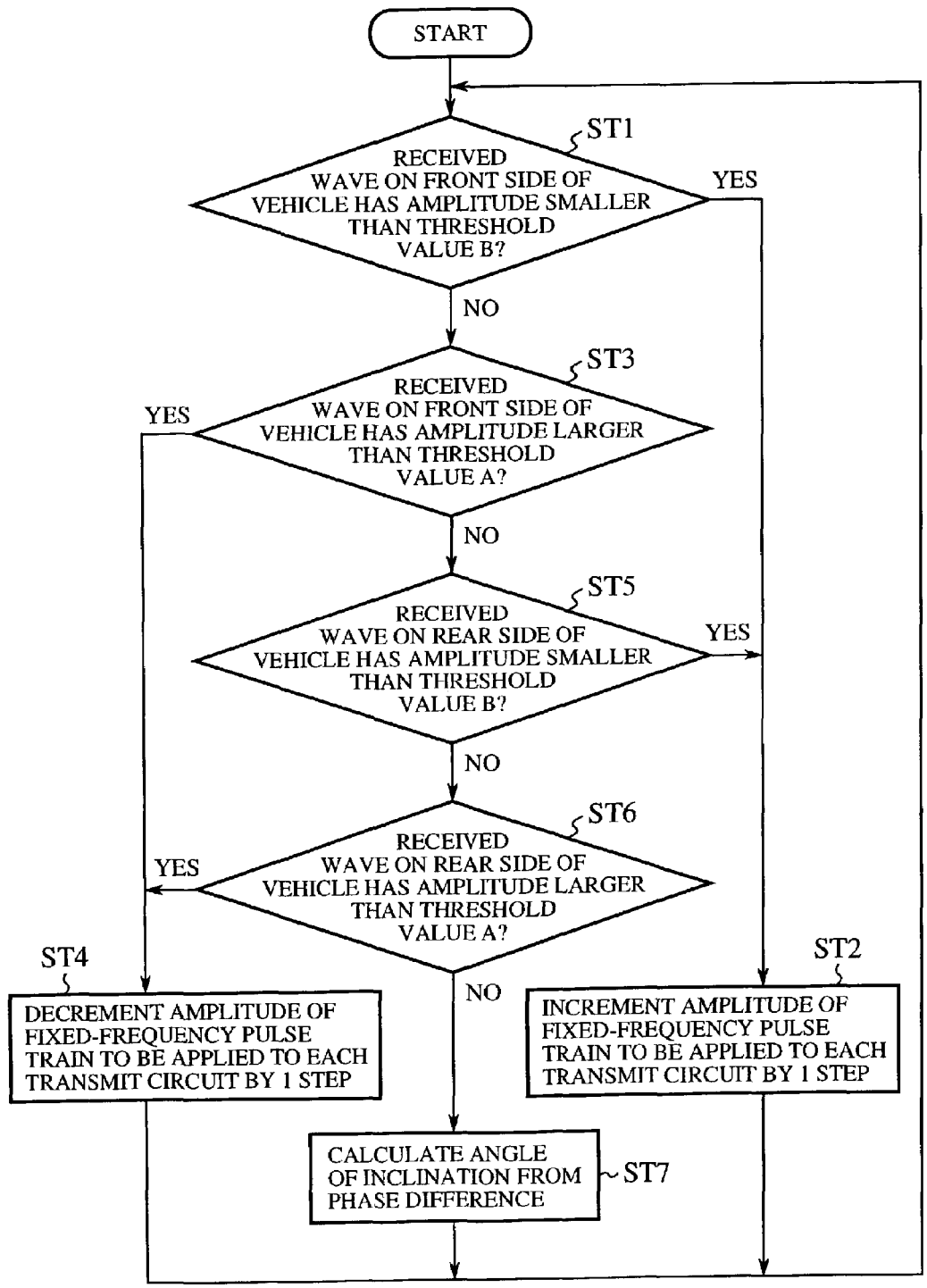
FIG. 20 is a flow chart showing processing performed by a calculation control circuit of an inclination angle measurement apparatus according to embodiment 6 of the present invention.

FIG. 20 is a flow chart showing processing performed by the calculation control circuit 14 of the inclination angle measurement apparatus according to embodiment 6 of the present invention. FIGS. 21 to 23 are explanatory drawings for showing the amplitude of a received ultrasonic wave as compared with the amplitude of an ultrasonic wave sent toward the road surface.

The calculation control circuit 14 shown in FIG. 17 delivers a control signal to the first power circuit 62*a* so that the fixed-frequency pulse train generated by the first transmit circuit 11*a* has an initially-set amplitude. The first power circuit 62*a* delivers a voltage corresponding to the control signal to the first transmit circuit 11*a*. The first transmit circuit 11*a* then generates the fixed-frequency pulse train having an initially-set amplitude according to the voltage from the first power circuit 62a. As a result, the first ultrasonic sensor 3 generates an ultrasonic wave having an initially-set amplitude, as shown in transmission A of FIG. 21. The ultrasonic wave A generated by the first ultrasonic sensor 3 is reflected from the road surface 2 and is received, as an ultrasonic wave C, by the third ultrasonic sensor 5. The third ultrasonic sensor 5 then converts the received ultrasonic wave C into an electric pulse signal. The first receive circuit 12a extracts only a fixed-frequency component from this electric pulse signal, and the first amplitude detector 61a detects the amplitude of the fixed-frequency component extracted by the first receive circuit 12a and delivers it to the calculation control circuit 14.

When the distance between the first and third ultrasonic sensors 3 and 5 and the road surface 2 is long, as shown in FIG. 19, the amplitude of the fixed-frequency component extracted by the first receive circuit 12a is small, as shown in reception C of FIG. 21. The calculation control circuit 14 compares the amplitude of the fixed-frequency component extracted by the first receive circuit 12a, which is detected by the first amplitude detector 61a, with a threshold value B (in step ST1 of FIG. 20). When the amplitude of the fixed-frequency component detected by the first amplitude detector 61a is smaller than the threshold value B, the calculation control circuit 14 delivers a control signal to the first power circuit 62a so that the amplitude of the fixed-frequency pulse train generated by the first transmit circuit 11 is incremented by only one step. The first power circuit 62a delivers a voltage corresponding to the control signal to the fist transmit circuit 11a, and the first transmit circuit 11a generates the fixed-frequency pulse train having an amplitude corresponding to the voltage. As a result, the first ultrasonic sensor 3 generates an ultrasonic wave having an amplitude determined by the fixed-frequency pulse train (in step ST2 of FIG. 20). Thus, when the amplitude of the fixed-frequency component detected by the first amplitude detector 61a is smaller than the threshold value B, the calculation control circuit 14 increases the amplitude of the ultrasonic wave that is to be generated by the first ultrasonic sensor 3, as shown in transmission A of FIG. 23, step by step, so that the amplitude of the fixed-frequency component detected by the first amplitude detector 61a, as shown in reception C of FIG. 23, becomes larger than the threshold value B.

When the distance between the first and third ultrasonic sensors 3 and 5 and the road surface 2 is short, as shown in FIG. 18, the amplitude of the fixed-frequency component extracted by the first receive circuit 12a is large, as shown in reception C of FIG. 22. The calculation control circuit 14 compares the amplitude of the fixed-frequency component extracted by the first receive circuit 12a, which is detected by the first amplitude detector 61a, with another threshold value A (in step ST3 of FIG. 20). When the amplitude of the fixed-frequency component detected by the first amplitude detector 61a is larger than the other threshold value A, the calculation control circuit 14 delivers a control signal to the first power circuit 62a so that the amplitude of the fixed-frequency pulse train generated by the first transmit circuit 11 is decremented by only one step. The first power circuit 62a delivers a voltage corresponding to the control signal to the fist transmit circuit 11a, and the first transmit circuit 11a generates the fixed-frequency pulse train having an amplitude corresponding to the voltage. As a result, the first ultrasonic sensor 3 generates an ultrasonic wave having an amplitude determined by the fixed-frequency pulse train (in step ST4 of FIG. 20). Thus, when the amplitude of the fixed-frequency component detected by the first amplitude detector 61a is larger than the other threshold value A, the calculation control circuit 14 decreases the amplitude of the ultrasonic wave that is to be generated by the first ultrasonic sensor 3 step by step so that the amplitude of the fixed-frequency component detected by the first amplitude detector 61a, as shown in reception C of FIG. 23, becomes smaller than the other threshold value A.

Similarly, the other set that consists of the calculation control circuit 14, the second power circuit 62b, the second transmit circuit 11b, the second and fourth ultrasonic sensors 4 and 6, and the second amplitude detector 61b can adjust the amplitude of the ultrasonic wave sent by the second ultrasonic sensor 4 and received by the fourth ultrasonic sensor 6 (in steps ST5 and ST6 of FIG. 20).

When the amplitudes of the fixed-frequency components detected by the first and second amplitude detectors 61a and 61b both fall within the predetermined range between the threshold values A and B, as shown in reception C of FIG. 23, the calculation control circuit 14 accepts the phase difference from the phase synchronization detecting circuit 13 and then calculates the angle of inclination of the vehicle with respect to the road surface 2 (in step ST7 of FIG. 20).

Thus, because the inclination angle measurement apparatus adjusts the amplitudes of the ultrasonic waves generated by the first and third ultrasonic sensors 3 and 4 so that the amplitudes of the fixed-frequency components detected by the first and second amplitude detectors 61a and 61b both fall within the predetermined range between the threshold values A and B, as shown in reception C of FIG. 23, by using the calculation control circuit 14, the inclination angle measurement apparatus can measure the phases of the received ultrasonic waves and the phase difference between the received ultrasonic waves by using the phase synchronization detecting circuit 13 regardless of the distance between the four ultrasonic sensors 3 to 6 and the road surface 2.

Furthermore, because the inclination angle measurement apparatus independently adjusts both the amplitude of the ultrasonic wave generated by the first ultrasonic sensor 3 disposed on the front side of the vehicle and the amplitude of the ultrasonic wave generated by the second ultrasonic sensor 4 disposed on the rear side of the vehicle, the inclination angle measurement apparatus can accommodate the difference between the sensibilities of the third and fourth ultrasonic sensors 5 and 6 so that the amplitudes of the fixed-frequency components detected by the first and second amplitude detectors 61a and 61b both fall within the predetermined range between the threshold values A and B.

As previously mentioned, the inclination angle measurement apparatus according to embodiment 6 of the present invention can have a structure similar to that of above-mentioned embodiment 4. As an alternative, the inclination angle measurement apparatus according to embodiment 6 of the present invention can have a structure similar to that of above-mentioned embodiment 1, 2, 3 or 5. When the inclination angle measurement apparatus according to embodiment 6 of the present invention has a structure similar to that of above-mentioned embodiment 1, 2 or 3, only one power supply circuit and only one transmit circuit are provided because the inclination angle measurement apparatus includes only one ultrasonic sensor for sending an ultrasonic wave toward a reflective object.

As mentioned above, in accordance with this embodiment 6, the inclination angle measurement apparatus can prevent the amplitudes of two received ultrasonic waves from becoming too small or too large and hence can prevent the measurement of the phase difference from becoming an impossibility and also can prevent a large error from occurring in the measured phase difference. In other words, the inclination angle measurement apparatus can measure the phase difference between the phases of two received ultrasonic waves with a high degree of accuracy.

Embodiment 7.

FIG. 24 is a block diagram showing the structure of an inclination angle measurement apparatus according to embodiment 7 of the present invention. As shown in the figure, the inclination angle measurement apparatus according to embodiment 7 is provided with only one transmit circuit 11 and only one power supply circuit 62. The transmit circuit 11 is so constructed as to generate a fixed-frequency pulse train having a number of pulses determined by a control signal from a calculation control circuit 14 and to deliver it to first and second ultrasonic sensors 3 and 4. The other components included in the inclination angle measurement apparatus according to embodiment 7 are the same as those of the inclination angle measurement apparatus according to embodiment 6 shown in FIG. 17, with the exception that the calculation control circuit 14 has a calculating function different from that of the calculation control circuit 14 of the inclination angle measurement apparatus according to embodiment 6.

Next, a description will be made as to an operation of the inclination angle measurement apparatus according to embodiment 7. Ultrasonic waves A and B generated by the first and second ultrasonic sensors 3 and 4 are reflected from a road surface 2 and are received, as ultrasonic waves C and D, by third and fourth ultrasonic sensors 5 and 6, respectively. There are other routes along which the ultrasonic waves A and B generated by the first and second ultrasonic sensors 3 and 4 directly enter the third and fourth ultrasonic sensors 5 and 6, respectively. Although in each of the third and fourth ultrasonic sensors 5 and 6 that receive the ultrasonic waves C and D, an influence (referred to as a reverberation from here on) of vibrations of the ultrasonic wave that has propagated directly to each ultrasonic sensor gradually diminishes with time, the reverberation may have an influence on the measurement of the ultrasonic wave C or D reflected from the road surface 2.

FIGS. 25 to 28 are explanatory drawings for showing the amplitude of a received ultrasonic wave as compared with the amplitude of an ultrasonic wave sent toward the road surface. When the distance between the first and third ultrasonic sensors 3 and 5 and the road surface 2 is short, as shown in FIG. 18, if the first ultrasonic sensor 3 sends an ultrasonic wave A having a normal number of pulses toward the road surface 2, as shown in transmission A of FIG. 25, the third ultrasonic sensor 5 receives an ultrasonic wave C reflected from the road surface 2 and including a reverberation caused by vibrations of the ultrasonic wave that has propagated directly thereto, as shown in reception C of FIG. 25. The inclination angle measurement apparatus therefore cannot accurately measure the phase of the reflected ultrasonic wave C because of the influence of the reverberation.

In contrast, when the distance between the first and third ultrasonic sensors 3 and 5 and the road surface 2 is long, as shown in FIG. 19, if the first ultrasonic sensor 3 sends an ultrasonic wave A having a small number of pulses toward the road surface 2, the energy of the ultrasonic wave C reflected from the road surface 2 and received by the third ultrasonic sensor 5 is small and the inclination angle measurement apparatus therefore cannot accurately measure the phase of the ultrasonic wave C.

To solve this problem, the calculation control circuit 14 shown in FIG. 24 detects a time that elapses until a fixed-frequency electric signal detected by a first amplitude detector 61a has a predetermined amplitude or more after the calculation control circuit 14 instructs the transmit circuit 11 to generate a fixed-frequency pulse train, i.e., a time Tac ($\propto$ the distance between the ultrasonic sensors and the reflective object) that elapses until an ultrasonic wave reflected from the road surface 2 is received by the third ultrasonic sensor 5 after being sent by the first ultrasonic sensor 3, as shown in FIG. 26, and delivers a control signal to the transmit circuit 11 so that the transmit circuit 11 generates the fixed-frequency pulse train having a number of pulses corresponding to the detected time Tac.

FIG. 27 shows a case where the distance between the ultrasonic sensors and the road surface 2 is short. When the time Tac that elapses until the fixed-frequency electric signal detected by the first amplitude detector 61a has a predetermined amplitude or more after the transmit circuit 11 is instructed to generate a fixed-frequency pulse train is short, the inclination angle measurement apparatus can reduce the number of pulses included in the ultrasonic wave A sent toward the road surface 2 by using the calculation control circuit 14 so that the received ultrasonic wave C is not under the influence of the reverberation and can have large energy, and can accurately measure the phase of the reflected ultrasonic wave C.

FIG. 28 shows a case where the distance between the ultrasonic sensors and the road surface 2 is long. When the time Tac that elapses until the fixed-frequency electric signal detected by the first amplitude detector 61a has a predetermined amplitude or more after the transmit circuit 11 is instructed to generate a fixed-frequency pulse train is long, the inclination angle measurement apparatus can increase the number of pulses included in the ultrasonic wave A sent toward the road surface 2 by using the calculation control circuit 14 so that the received ultrasonic wave C is not under the influence of the reverberation and can have large energy, and can accurately measure the phase of the reflected ultrasonic wave C.

Figure 29:
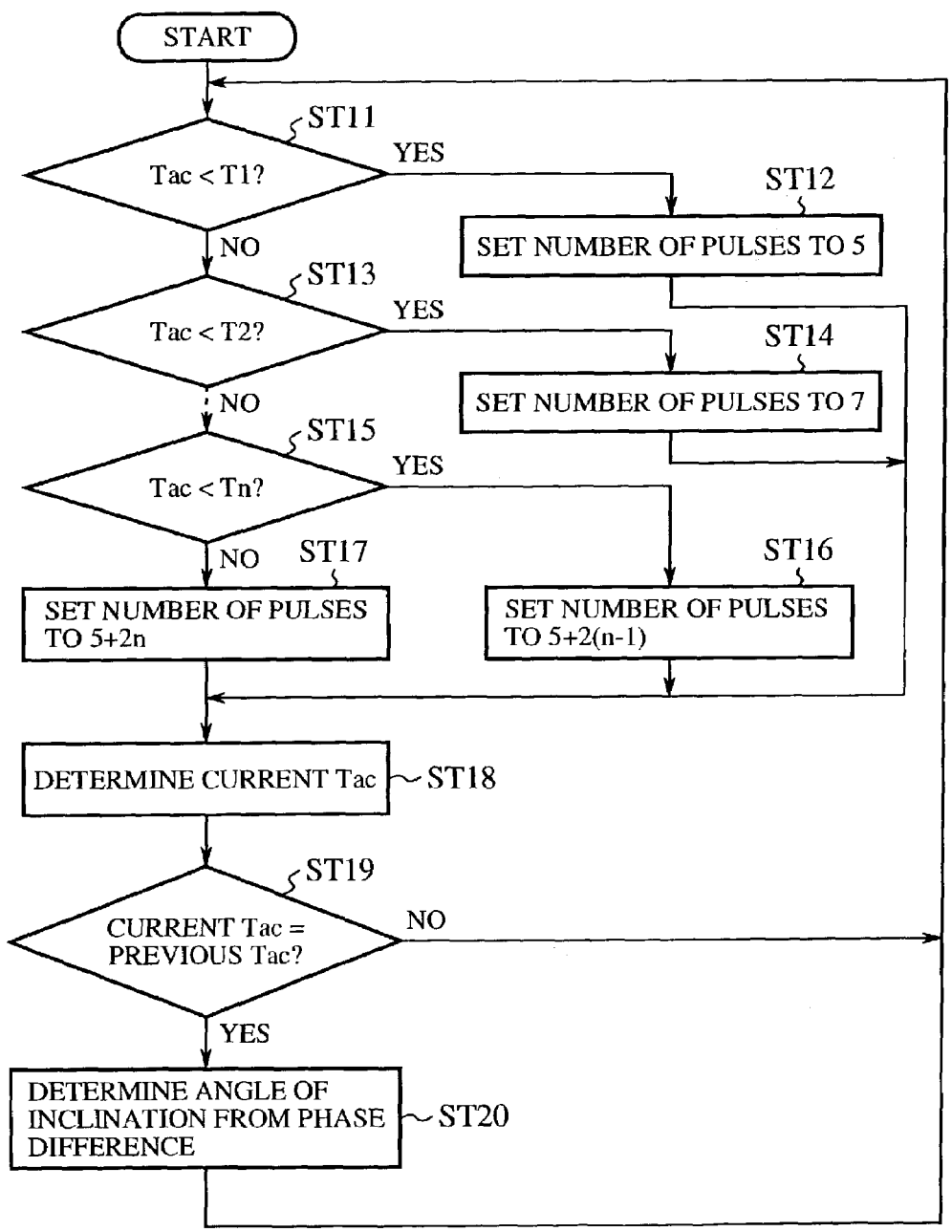
FIG. 29 is a flow chart showing processing performed by a calculation control circuit of an inclination angle measurement apparatus according to embodiment 7 of the present invention.

FIG. 29 is a flow chart showing processing performed by the calculation control circuit of the inclination angle measurement apparatus according to embodiment 7 of the present invention. Processing performed by the calculation control circuit 14 will be explained with reference to the figure. The calculation control circuit 14 presets a plurality of different times T1 to Tn (T1<T2<...<Tn) to be compared with the detected time Tac and a plurality of numbers of pulses respectively corresponding to those preset times T1 to Tn. The calculation control circuit 14 also sets an initial value (<T1) of the time Tac.

As shown in FIG. 29, the calculation control circuit 14 compares the initial value of Tac with the time T1 first (in step ST11). Initially, because the initial value <T1, the calculation control circuit 14 delivers a control signal to the transmit circuit 11 so that the transmit circuit 11 generates a fixed-frequency pulse train having 5 pulses (in step ST12). The calculation control circuit 14 then measures the time Tac that elapses until fixed-frequency electric signals detected by the first and second amplitude detector 61a and 62a have a predetermined amplitude or more after the calculation control circuit 14 instructs the transmit circuit 11 to generate a fixed-frequency pulse train (in step ST18). The calculation control circuit 14 compares the currently-measured time Tac with the previously-measured time Tac (in step ST19). In this case, because the previously-measured time Tac has the initial value and therefore the currently-measured time Tac is not equal to the previously-measured time Tac, the calculation control circuit 14 returns to step ST11 in which it determines if the currently-measure time Tac falls within which time range TR (Tk≦TR<Tk+1; k=1 to n−1) (in steps ST11, ST13, and ST15). When the calculation control circuit 14 determines that the currently-measure time Tac falls within a time range TR (Tk≦TR<Tk+1; k=1 to n−1), it delivers a control signal to the transmit circuit 11 so that the transmit circuit 11 generates the fixed-frequency pulse train having a corresponding number of pulses (in step ST12, ST14, ST16, or ST17). After that, the calculation control circuit 14 measures the time Tac again (in step ST18). The calculation control circuit 14 then compares the currently-measured time Tac with the previously-measured time Tac (in step ST19). When the currently-measured time Tac matches up with the previously-measured time Tac, the calculation control circuit 14 assumes that the transmit circuit 11 generates the fixed-frequency pulse train having a number of pulses corresponding to the time Tac, accepts the phase difference from a phase synchronization detecting circuit 13, and calculates the angle of inclination of the vehicle with respect to the road surface 2 (in step ST20).

Thus, because the calculation control circuit 14 calculates the angle of inclination of the vehicle with respect to the road surface 2 under the condition that the currently-measured time Tac matches up with the previously-measured time Tac, the inclination angle measurement apparatus according to embodiment 7 can prevent the calculation of the angle of inclination of the vehicle from been performed with a low degree of accuracy when the distance between the ultrasonic sensors and the road surface 2 changes rapidly.

As previously mentioned, the inclination angle measurement apparatus according to embodiment 7 of the present invention can have a structure similar to that of above-mentioned embodiment 4. As an alternative, the inclination angle measurement apparatus according to embodiment 7 of the present invention can have a structure similar to that of above-mentioned embodiment 1, 2, 3 or 5. In addition, as shown in above-mentioned embodiment 6, the inclination angle measurement apparatus according to embodiment 7 of the present invention can have two transmit circuits that respectively set numbers of pulses included in fixed-frequency pulse trains to be delivered to a set of first and third ultrasonic sensors 3 and 5 disposed on a front side of the vehicle, and to another set of second and fourth ultrasonic sensors 4 and 6 disposed on a rear side of the vehicle, independently of each other.

As mentioned above, in accordance with this embodiment 7, when the time Tac that elapses until a fixed-frequency electric signal detected by each amplitude detector has a predetermined amplitude or more after the transmit circuit 11 is instructed to generate a fixed-frequency pulse train is short, the inclination angle measurement apparatus can decrease the number of pulses included in each ultrasonic wave sent toward the reflective object, whereas when the time Tac is long, the inclination angle measurement apparatus can increase the number of pulses included in each ultrasonic wave sent toward the reflective object. As a result, each of two received ultrasonic waves is not under the influence of a reverberation and can have large energy, and therefore the inclination angle measurement apparatus can accurately measure the phase difference between the two reflected ultrasonic waves.

Embodiment 8.

FIGS. 30 and 31 are explanatory drawings for showing the amplitude of a received ultrasonic wave as compared with the amplitude of an ultrasonic wave sent toward a reflective object, such as a road surface, in an inclination angle measurement apparatus in accordance with embodiment 8 of the present invention. FIG. 30 shows a case where because the distance between the inclination angle measurement apparatus of embodiment 8 of the present invention and a road surface 2 is short, the inclination angle measurement apparatus sends an ultrasonic wave having a normal number of pulses toward the road surface 2, receives an ultrasonic wave C including a reverberation, which is reflected from the road surface 2, and therefore cannot accurately measure the phase of the ultrasonic wave C because of the influence of the reverberation.

While the inclination angle measurement apparatus according to this embodiment 8 has the same structure as that of above-mentioned embodiment 7 as shown in FIG. 24, the inclination angle measurement apparatus according to this embodiment 8 differs from that of embodiment 7 in that a calculation control circuit 14 presets another threshold value C used for determining whether the reverberation wave has a certain amplitude or less in addition to a threshold value used for determining whether it has received an ultrasonic wave C reflected from the road surface 2.

When the amplitudes of two received ultrasonic waves C and D detected by first and second amplitude detectors 61a and 61b do not become equal to or smaller than the other threshold value C, but reach the threshold value, as shown in FIG. 30, the calculation control circuit 14 determines that it cannot accurately measure the phases of the two reflected ultrasonic waves C and D because ultrasonic waves emitted out of first and second ultrasonic sensors 3 and 4 have a too large number of pulses, and delivers a control signal to a transmit circuit 11 so that the ultrasonic waves emitted out of the first and second ultrasonic sensors 3 and 4 have a smaller number of pulses.

When the amplitudes of the two received ultrasonic waves C and D detected by the first and second amplitude detectors 61a and 61b become equal to or smaller than the other threshold value C and, after that, reach the threshold value, as shown in FIG. 31, the calculation control circuit 14 determines that the ultrasonic waves emitted out of the first and second ultrasonic sensors 3 and 4 have a proper number of pulses and the calculation control circuit 14 therefore can accurately measure the phases of the two ultrasonic waves reflected from the road surface 2 without being under the influence of the reverberation, and then calculates an angle of inclination of a vehicle with respect to the road surface from those phases and the phase difference between the phases.

As previously mentioned, the inclination angle measurement apparatus according to embodiment 8 of the present invention can have a structure similar to that of above-mentioned embodiment 4. As an alternative, the inclination angle measurement apparatus according to embodiment 8 of the present invention can have a structure similar to that of above-mentioned embodiment 1, 2, 3 or 5. In addition, as shown in above-mentioned embodiment 6, the inclination angle measurement apparatus according to embodiment 8 of the present invention can have two transmit circuits that respectively set numbers of pulses included in fixed-frequency pulse trains to be delivered to a set of first and third ultrasonic sensors 3 and 5 disposed on a front side of the vehicle, and to another set of second and fourth ultrasonic sensors 4 and 6 disposed on a rear side of the vehicle, independently of each other.

As mentioned above, in accordance with this embodiment 8, the inclination angle measurement apparatus can decrease the number of pulses included in each ultrasonic wave sent toward the reflective object so that the reverberation wave has a certain amplitude or less. As a result, each of two received ultrasonic waves is not under the influence of a reverberation, and therefore the inclination angle measurement apparatus can accurately measure the phase difference between the two reflected ultrasonic waves.

Embodiment 9.

Figure 32:
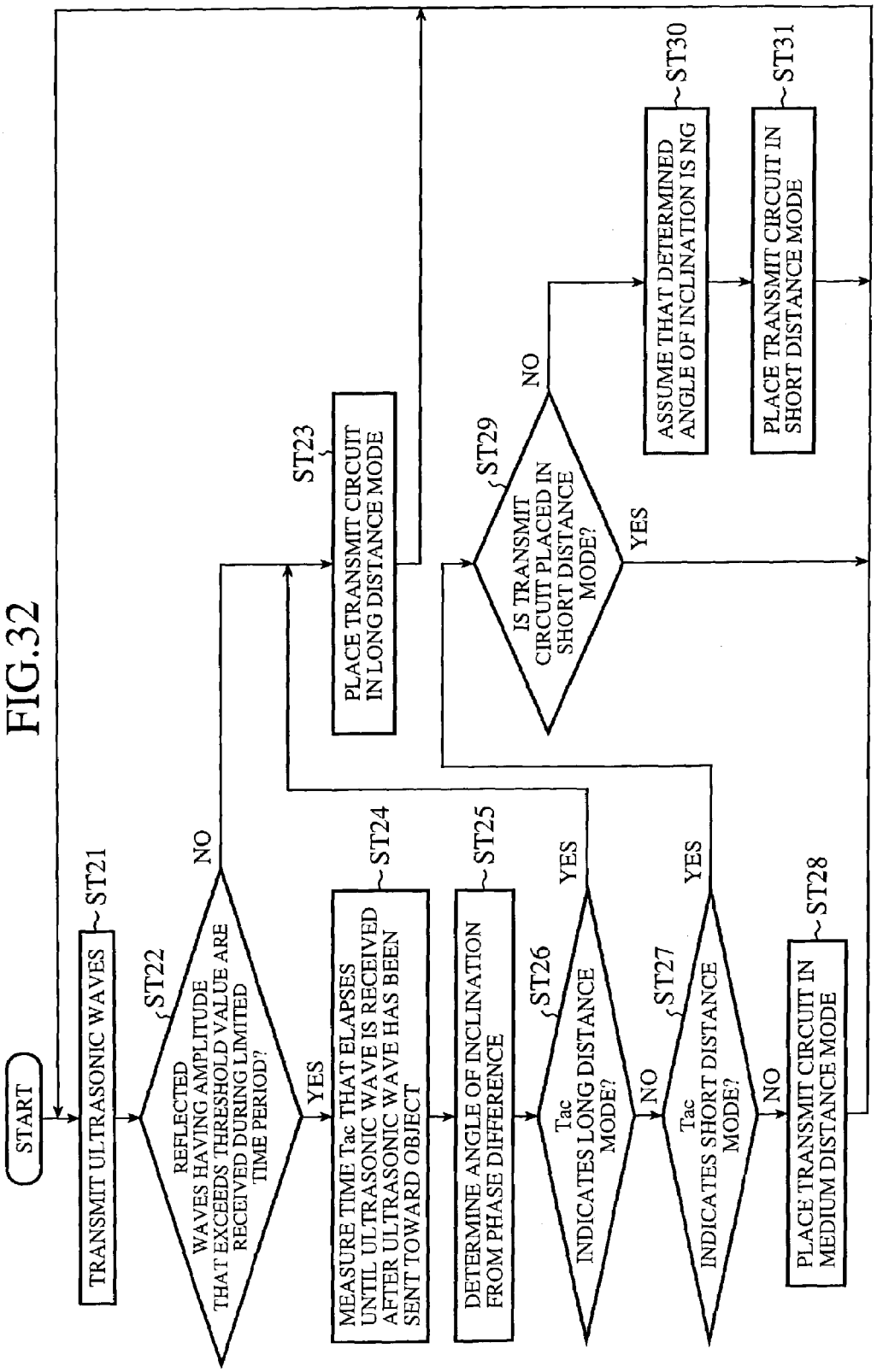
FIG. 32 is a flow chart showing processing performed by a calculation control circuit of an inclination angle measurement apparatus according to embodiment 9 of the present invention.

FIG. 32 is a flow chart showing processing performed by a calculation control circuit of an inclination angle measurement apparatus according to embodiment 9 of the present invention.

As previously mentioned, the inclination angle measurement apparatus according to embodiment 6 adjusts the amplitudes of ultrasonic waves sent toward a reflective object, such as a road surface, according to the distance between the inclination angle measurement apparatus and the reflective object, and the inclination angle measurement apparatus according to either of embodiments 7 and 8 adjusts the number of pulses included in each of ultrasonic waves sent toward a reflective object according to the distance between the inclination angle measurement apparatus and the reflective object. In contrast, although the inclination angle measurement apparatus according to this embodiment 9 has the same structure as that of above-mentioned embodiment 7 as shown in FIG. 24, the calculation control circuit 14 has three modes: long distance mode, medium distance mode, and short distance mode according to the distance between the inclination angle measurement apparatus and the reflective object, and sets the amplitudes of ultrasonic waves sent toward the reflective object and the number of pulses included in each of the ultrasonic waves according to a mode selected from the three modes by using a table or the like. In other words, when the calculation control circuit 14 enters the long distance mode, it sets the amplitude of each ultrasonic wave sent toward the reflective object to a large one and also sets the number of pulses included in each ultrasonic wave sent toward the reflective object to a large one. When the calculation control circuit 14 enters the medium distance mode, it sets the amplitude of each ultrasonic wave sent toward the reflective object to a medium one and also sets the number of pulses included in each ultrasonic wave sent toward the reflective object to a medium one. When the calculation control circuit 14 enters the short distance mode, it sets the amplitude of each ultrasonic wave sent toward the reflective object to a small one and also sets the number of pulses included in each ultrasonic wave sent toward the reflective object to a small one.

The calculation control circuit 14 then measures a time Tac that elapses until the inclination angle measurement apparatus receives an ultrasonic wave reflected from the reflective object after sending ultrasonic waves toward the reflective object, selects either of the three modes according to the measured time Tac, and adjusts the amplitude of each ultrasonic wave sent toward the reflective object and the number of pulses included in each ultrasonic wave sent toward the reflective object according to the selected mode.

Processing performed by the calculation control circuit 14 will be explained hereafter with reference to FIG. 32. First of all, first and second ultrasonic sensors 3 and 4 send ultrasonic waves having an amplitude and a number of pulses corresponding to an initially-set mode to a road surface 2 (in step ST21). For example, when the initially-set mode is the medium distance mode, each of the first and second ultrasonic sensors 3 and 4 sends an ultrasonic wave having a medium amplitude and a medium number of pulses to the road surface 2. Next, the calculation control circuit 14 determines whether the amplitudes of received ultrasonic waves exceed a threshold value within a limited time period corresponding to a maximum allowable distance between the inclination angle measurement apparatus and the reflective object (in step ST22). When the amplitudes of received ultrasonic waves don't exceed the threshold value within the limited time period, the calculation control circuit 14 determines that the ultrasonic wave sent by each of the first and second ultrasonic sensors 3 and 4 has not enough amplitude and enough number of pulses for the distance between the inclination angle measurement apparatus and the reflective object and each of the received ultrasonic waves has too small energy, and then enters the long distance mode (in step ST23). Each of the first and second ultrasonic sensors 3 and 4 then sends an ultrasonic wave having a large amplitude and a large number of pulses associated with the long distance mode to the road surface 2 (in step ST21).

When determining that the amplitudes of received ultrasonic waves exceed the threshold value within the limited time period, in step ST22, the calculation control circuit 14 measures the time Tac that elapses until third and fourth ultrasonic sensors 5 and 6 receives the ultrasonic waves reflected from the reflective object after the first and second ultrasonic sensors 3 and 4 have sent the ultrasonic waves toward the reflective object, and calculates the angle of inclination of the vehicle with respect to the reflective object from the phase difference between the phases of the received ultrasonic waves (in step ST25). In addition, the calculation control circuit 14 determines whether the time Tac measured in step ST24 indicates the long distance mode (in step ST26). When the time Tac indicates the long distance mode, the calculation control circuit 14 enters the long distance mode (in step ST23). Each of the first and second ultrasonic sensors 3 and 4 then sends an ultrasonic wave having a large amplitude and a large number of pulses associated with the long distance mode to the road surface 2 (in step ST21). In contrast, unless the time Tac indicates the long distance mode in step ST26, the calculation control circuit 14 determines whether the time Tac measured in step ST24 indicates the short distance mode (in step ST27). Because the calculation control circuit 14, in step ST27, determines that the time Tac must indicate the medium distance mode unless the time Tac indicates the short distance mode, the calculation control circuit 14 enters the medium distance mode (in step ST28) so that each of the first and second ultrasonic sensors 3 and 4 then sends an ultrasonic wave having a medium amplitude and a medium number of pulses associated with the medium distance mode to the road surface 2 (in step ST21).

When determining that the time Tac indicates the short distance mode in step ST27, the calculation control circuit 14 further determines whether or not it is entering the short distance mode now (in step ST29). Unless the calculation control circuit 14 is entering the short distance mode now, the calculation control circuit 14 assumes that the outputs of first and second receive circuit 12a and 12b are saturated and disables the angle of inclination calculated in step ST25 because each of the first and second ultrasonic sensors 3 and 4 sends an ultrasonic wave having a large amplitude and a large number of pulses even though the time Tac is short and therefore the distance between the inclination angle measurement apparatus and the reflective object is short (in step ST30). The calculation control circuit 14 enters the short distance mode (in step ST31) so that each of the first and second ultrasonic sensors 3 and 4 then sends an ultrasonic wave having a small amplitude and a small number of pulses associated with the short distance mode to the road surface 2 (in step ST21). The calculation control circuit 14, in step ST29, determines that it is entering the short distance mode now, and remains in the short distance mode, so that each of the first and second ultrasonic sensors 3 and 4 sends an ultrasonic wave having a small amplitude and a small number of pulses associated with the short distance mode to the road surface 2 (in step ST21).

As previously mentioned, the inclination angle measurement apparatus according to embodiment 9 of the present invention can have a structure similar to that of above-mentioned embodiment 4. As an alternative, the inclination angle measurement apparatus according to embodiment 9 of the present invention can have a structure similar to that of above-mentioned embodiment 1, 2, 3 or 5. In addition, as shown in above-mentioned embodiment 6, the inclination angle measurement apparatus according to embodiment 9 of the present invention can have two sets of a power supply circuit and a transmit circuit that respectively set amplitudes and numbers of pulses included in fixed-frequency pulse trains to be delivered to a set of first and third ultrasonic sensors 3 and 5 disposed on a front side of the vehicle, and to another set of second and fourth ultrasonic sensors 4 and 6 disposed on a rear side of the vehicle, independently of each other.

As mentioned above, in accordance with this embodiment 9, when the time Tac that elapses until a fixed-frequency electric signal detected by each amplitude detector has a predetermined amplitude or more after the transmit circuit 11 is instructed to generate a fixed-frequency pulse train is short, that is, when the distance between the inclination angle measurement apparatus and a reflective object is short, the inclination angle measurement apparatus can decrease the amplitude of each ultrasonic wave sent toward the reflective object and the number of pulses included in each ultrasonic wave sent toward the reflective object. As a result, each of two received ultrasonic waves is not under the influence of saturation and a reverberation, and therefore the inclination angle measurement apparatus can accurately measure the phase difference between the two reflected ultrasonic waves. On the other hand, when the time Tac is long, that is, when the distance between the inclination angle measurement apparatus and a reflective object is long, the inclination angle measurement apparatus can increase the amplitude of each ultrasonic wave sent toward the reflective object and the number of pulses included in each ultrasonic wave sent toward the reflective object. As a result, the inclination angle measurement apparatus can detect each of two received ultrasonic waves is not under the influence of saturation and a reverberation, and therefore can accurately measure the phase difference between the two reflected ultrasonic waves.

Embodiment 10.

Figure 33:
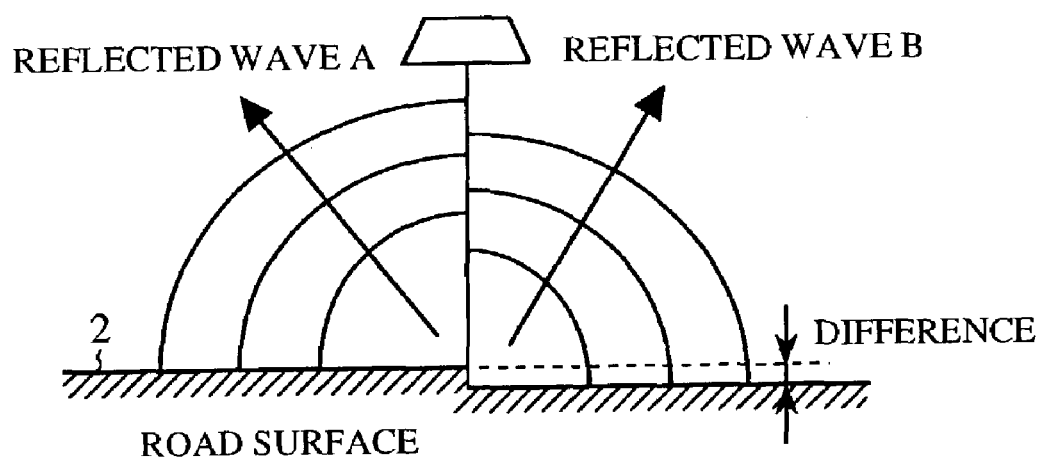
FIG. 33 is an explanatory drawing showing a case where a phase difference occurs in two reflected waves due to road irregularities in an inclination angle measurement apparatus according to embodiment 10 of the present invention.
Figure 34:
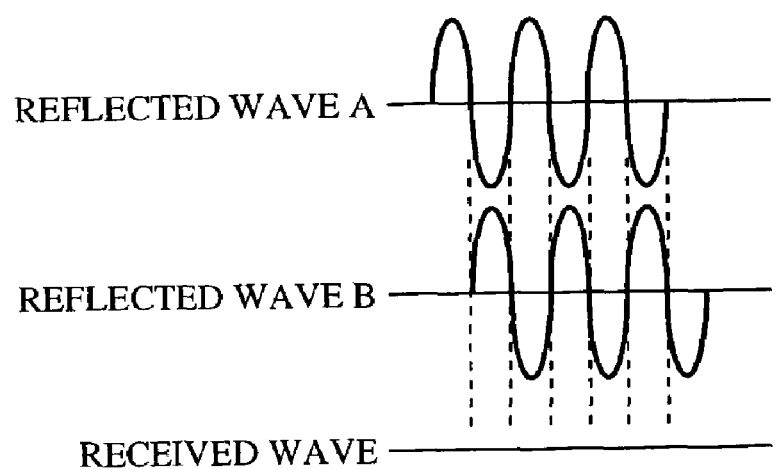
FIG. 34 is an explanatory drawing showing a case where two ultrasonic waves reflected from a road surface are 180° out of phase with each other and therefore received waves vanish.

FIG. 33 is an explanatory drawing showing a case where a phase difference occurs in two reflected waves due to road irregularities, and FIG. 34 is an explanatory drawing showing an example in which the two reflected waves are 180° out of phase with each other and therefore received waves vanish.

When there is a difference in level on a road surface 2 from which ultrasonic waves are reflected, a phase difference that depends on the height of the difference in level occurs in the reflected ultrasonic waves. When each ultrasonic sensor sends an ultrasonic wave toward the road surface 2 having a difference in level as shown in FIG. 33, two parts of the road surface 2 separated by the difference reflect the incident ultrasonic wave at different times, and this results in two reflected waves A and B. If the two reflected waves A and B are 180° out of phase with each other, those reflected waves are attenuated extremely due to an interference between them when reaching an ultrasonic sensor, and therefore the ultrasonic sensor cannot receive any received wave, as shown in FIG. 34. For example, when the road surface 2 has road irregularities or water drops thereon having a height of about 2 mm which is equal to one-quarter wavelength of ultrasonic waves of a frequency of 40 kHz, the two reflected waves A and B are 180° out of phase with each other if they have a frequency of 40 kHz, and therefore no ultrasonic sensor can receive any received wave. In contrast, when the ultrasonic wave sent toward the road surface 2 has a frequency of 40 kHz or less, e.g. 20 kHz, the two reflected waves A and B are 180° out of phase with each other only if the road surface 2 has a difference in level having a height of 4 mm, which is caused by road irregularities or water drops thereon. Therefore, when the ultrasonic wave sent toward the road surface 2 has a frequency of 40 kHz or less, e.g. 20 kHz, the frequency of being under the influence of such a difference in level on the road surface can be reduced. When the ultrasonic wave sent toward the road surface 2 has a frequency of 10 kHz, for example, human beings can hear the ultrasonic wave and therefore a noise problem arises. Therefore, it is preferable that each ultrasonic wave sent toward the road surface 2 has a frequency of about 20 kHz. In this case, the inclination angle measurement apparatus can eliminate the influence of a difference in level having a height of 4 mm or less caused by road irregularities or water drops on the road surface, and can also prevent a noise problem from arising.

Embodiment 11.

Figure 35:
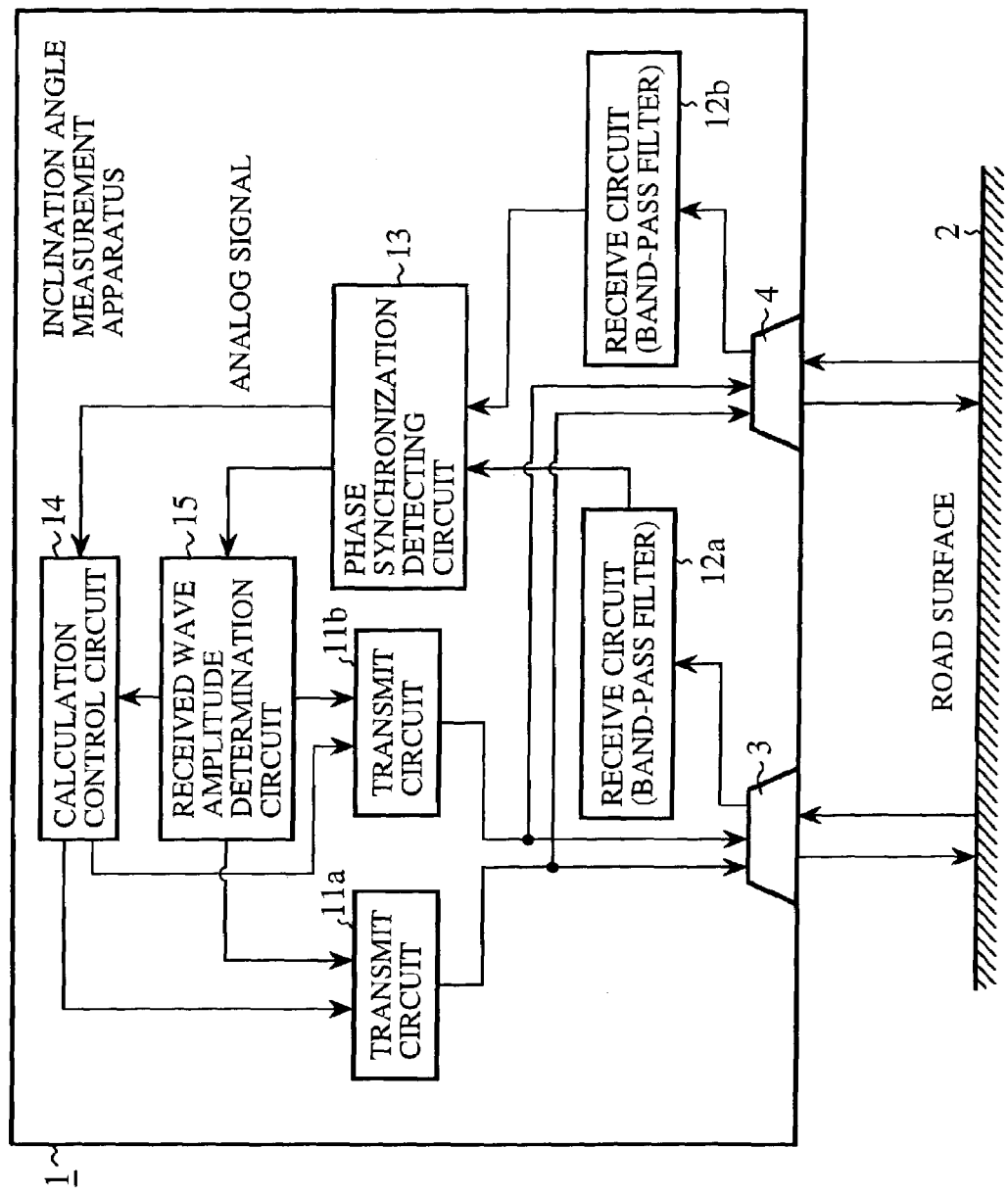
FIG. 35 is a block diagram showing the structure of an inclination angle measurement apparatus according to embodiment 11 of the present invention.

FIG. 35 is a block diagram showing the structure of an inclination angle measurement apparatus according to embodiment 11 of the present invention. In the figure, reference numeral 11a denotes a first transmit circuit for generating a fixed-frequency pulse train of a frequency of about 40 kHz, for example, reference numeral 11b denotes a second transmit circuit for generating a fixed-frequency pulse train of a frequency of about 20 kHz, for example, and reference numeral 15 denotes a received wave amplitude determination circuit for detecting the amplitudes of received waves, and for switching between the first and second transmit circuits 11a and 11b according to a decrease in the amplitudes of the received waves. The other components included in the inclination angle measurement apparatus according to embodiment 11 are the same as those of the inclination angle measurement apparatus according to embodiment 5 shown in FIG. 13.

In normal operation, the inclination angle measurement apparatus enables the first transmit circuit 11a to generate and deliver a fixed-frequency pulse train of a frequency of about 40 kHz, for example, to first and second ultrasonic sensors 3 and 4 so that each of them sends an ultrasonic wave of a frequency of about 40 kHz toward a road surface 2. When road irregularities or water drops on the road surface 2 have a height equal to one-quarter wavelength of the ultrasonic wave of a frequency of about 40 kHz, two received waves are reduced in amplitude, as shown in FIG. 34, and therefore the inclination angle measurement apparatus cannot measure the phase difference between them. At this time, when the received wave amplitude determination circuit 15 determines that each of the two received waves doesn't have a predetermined amplitude or more, the received wave amplitude determination circuit 15 stops the first transmit circuit 11a and then enables the second transmit circuit 11b to generate and deliver a fixed-frequency pulse train of a frequency of about 20 kHz, for example, to the first and second ultrasonic sensors 3 and 4 so that each of them sends an ultrasonic wave of a frequency of about 20 kHz toward the road surface 2.

Thus, even when two reflected ultrasonic waves interfere with each other because of road irregularities or water drops on the road surface and therefore they decrease in amplitude, the inclination angle measurement apparatus can measure the phase difference between the two reflected ultrasonic waves by switching between the two frequencies of each ultrasonic wave sent toward the reflective object.

As previously mentioned, the inclination angle measurement apparatus according to embodiment 11 of the present invention can have a structure similar to that of above-mentioned embodiment 5. As an alternative, the inclination angle measurement apparatus according to embodiment 11 of the present invention can have a structure similar to that of above-mentioned embodiment 1, 2, 3 or 4.

Embodiment 12.

Figure 36:
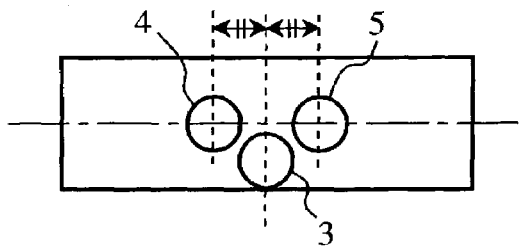
FIG. 36 is a bottom plan view showing the placement of ultrasonic sensors included in an inclination angle measurement apparatus according to embodiment 12 of the present invention.

FIG. 36 is a bottom plan view showing the placement of three ultrasonic sensors of an inclination angle measurement apparatus according to embodiment 12 of the present invention.

In the inclination angle measurement apparatus according to above-mentioned embodiment 1 or the like, three ultrasonic sensors 3 to 5 are arranged in a line along the length of a vehicle, as shown in FIG. 2. In this case, although the second and third ultrasonic sensors 4 and 5 each for receiving a reflected ultrasonic wave have to be brought close to each other in order to expand a range of measurable angles of inclination, they cannot be brought close each other because the first ultrasonic sensor 3 for sending an ultrasonic wave toward a reflective object obstructs them. In accordance with this embodiment 12, in order to solve this problem, the first ultrasonic sensor 3 is moved, by a predetermined distance, along the width of the vehicle on a perpendicular bisector of a line segment connecting the second and third ultrasonic sensors 4 and 5 with each other, as shown in FIG. 36. Because the first ultrasonic sensor 3 is moved along the width of the vehicle, it is not necessary to provide additional space for the first ultrasonic sensor 3, and the spacing between the second and third ultrasonic sensors 4 and 5 can be easily reduced and therefore the range of measurable angles of inclination can be expanded.

Embodiment 13.

Figure 37:
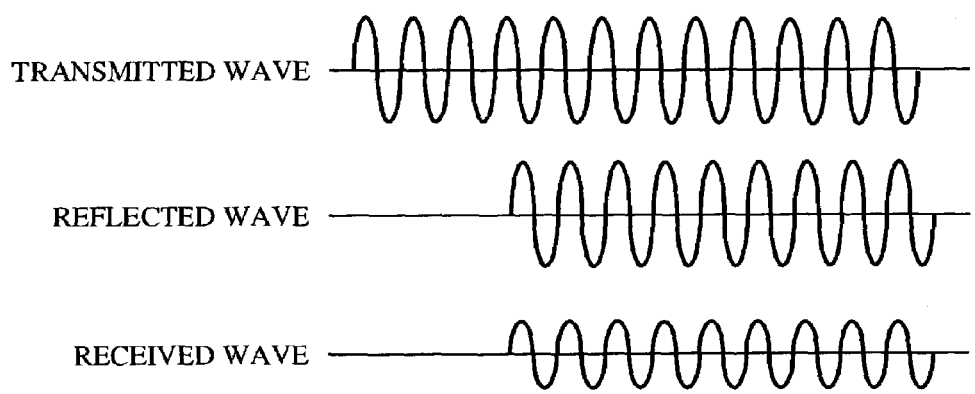
FIG. 37 is a diagram showing the waveforms of reflected waves and received waves when each ultrasonic sensor for sending an ultrasonic wave continuously sends an ultrasonic wave toward a road surface.
Figure 38:
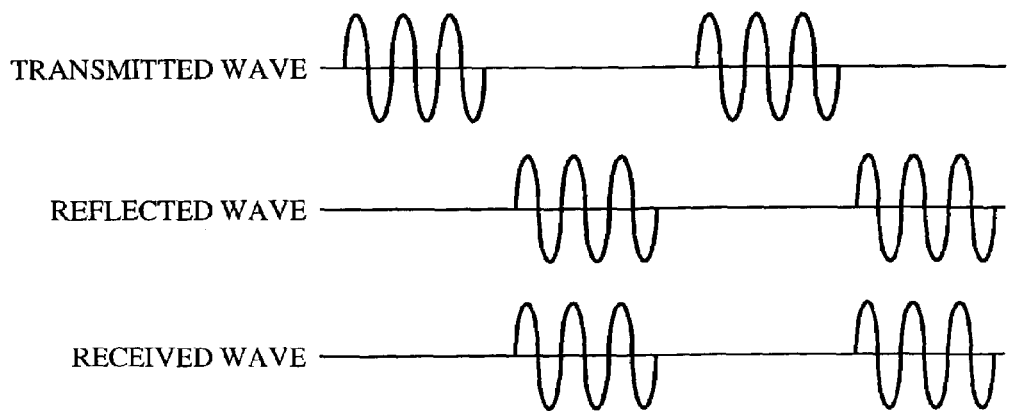
FIG. 38 is a diagram showing the waveforms of reflected waves and received waves when each ultrasonic sensor for sending an ultrasonic wave of an inclination angle measurement apparatus according to embodiment 13 intermittently sends an ultrasonic wave toward a road surface.

FIG. 37 is a diagram showing the waveforms of reflected waves and received waves when each ultrasonic sensor for sending an ultrasonic wave continuously sends an ultrasonic wave toward a reflective object such as a road surface, and FIG. 38 is a diagram showing the waveforms of reflected waves and received waves when each ultrasonic sensor for sending an ultrasonic wave of an inclination angle measurement apparatus according to embodiment 13 intermittently sends an ultrasonic wave toward a reflective object such as a road surface.

As shown in FIG. 37, when each ultrasonic sensor for sending an ultrasonic wave toward a reflective object keeps sending an ultrasonic wave toward a road surface, in order for an inclination angle measurement apparatus to measure an angle of inclination of a vehicle with respect to the reflective object, a reflected ultrasonic wave that has been reflected from the road surface and returns to each ultrasonic sensor interferes with an ultrasonic wave newly sent by each ultrasonic sensor and is therefore attenuated and transformed and this results in an impossibility of measuring the angle of inclination of the vehicle with a high degree of accuracy.

Then, in the inclination angle measurement apparatus according to embodiment 13, each ultrasonic sensor for sending an ultrasonic wave intermittently sends an ultrasonic wave having a several number of pulses toward the road surface so that a reflected ultrasonic wave that has been reflected from the road surface and returns to each ultrasonic sensor does not interfere with an ultrasonic wave newly sent by each ultrasonic sensor, as shown in FIG. 38.

Embodiment 14.

Figure 39:
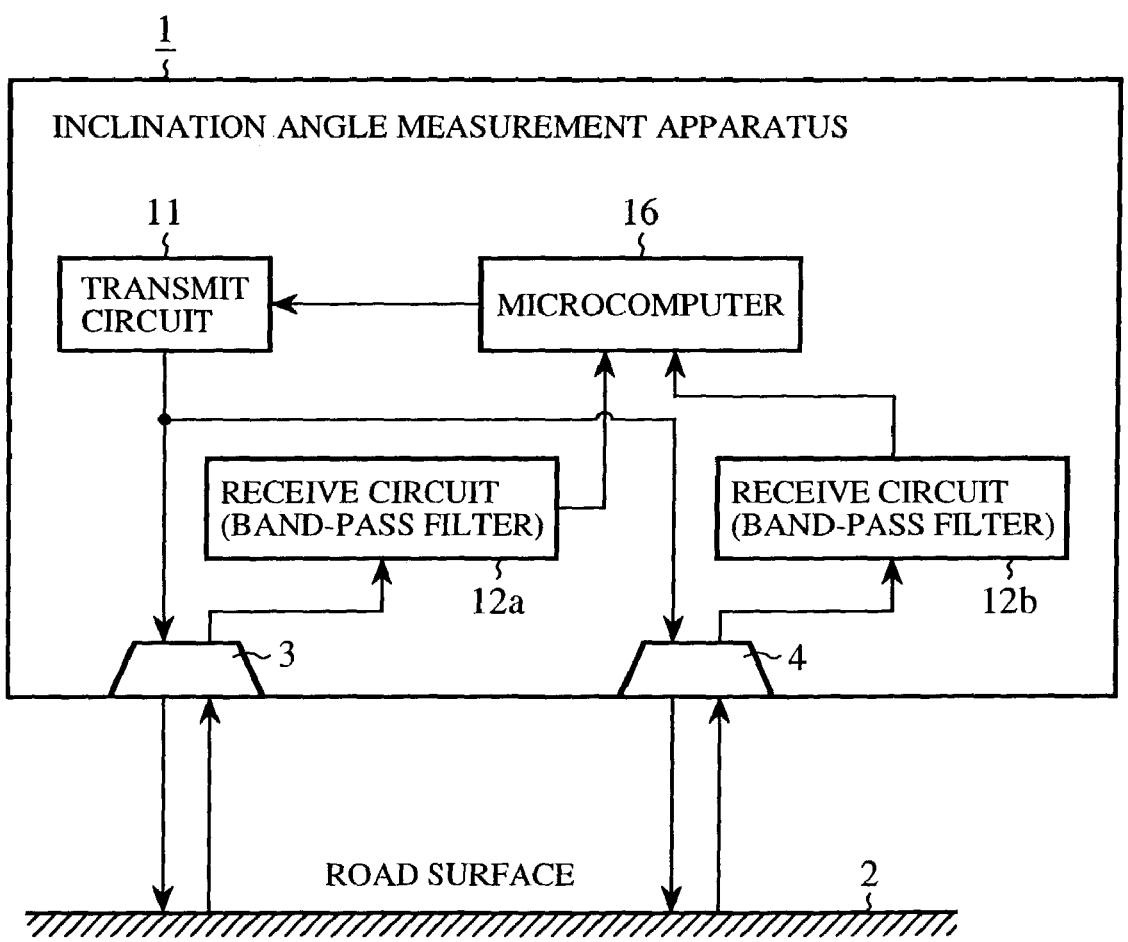
FIG. 39 is a block diagram showing the structure of an inclination angle measurement apparatus according to embodiment 14 of the present invention.

FIG. 39 is a block diagram showing the structure of an inclination angle measurement apparatus according to embodiment 14 of the present invention. In the figure, reference numeral 16 denotes a microcomputer that accepts fixed-frequency pulse trains that pass through receive circuits 12a and 12b, respectively, and that measures an angle of inclination of a vehicle with respect to a reflective object, such as a road surface, from the phase difference between those fixed-frequency pulse trains. The other components included in the inclination angle measurement apparatus according to embodiment 14 are the same as those of the inclination angle measurement apparatus according to embodiment 5 shown in FIG. 13, with the exception that the phase synchronization detecting circuit 13 and the calculation control circuit 14 are omitted. The microcomputer 16 is so constructed as to perform digital processing that is equivalent to the analog processing performed by the phase synchronization detecting circuit 13.

The microcomputer 16 shown in FIG. 39 accepts fixed-frequency pulse trains that pass through the receive circuits 12a and 12b, respectively, and measures the angle of inclination of the vehicle with respect to the road surface 2 from the phase difference between those fixed-frequency pulse trains. Therefore, the inclination angle measurement apparatus according to embodiment 14 needs not have the phase synchronization detecting circuit 13 and the calculation control circuit 14 as shown in FIG. 13.

Embodiment 15.

Figure 40:
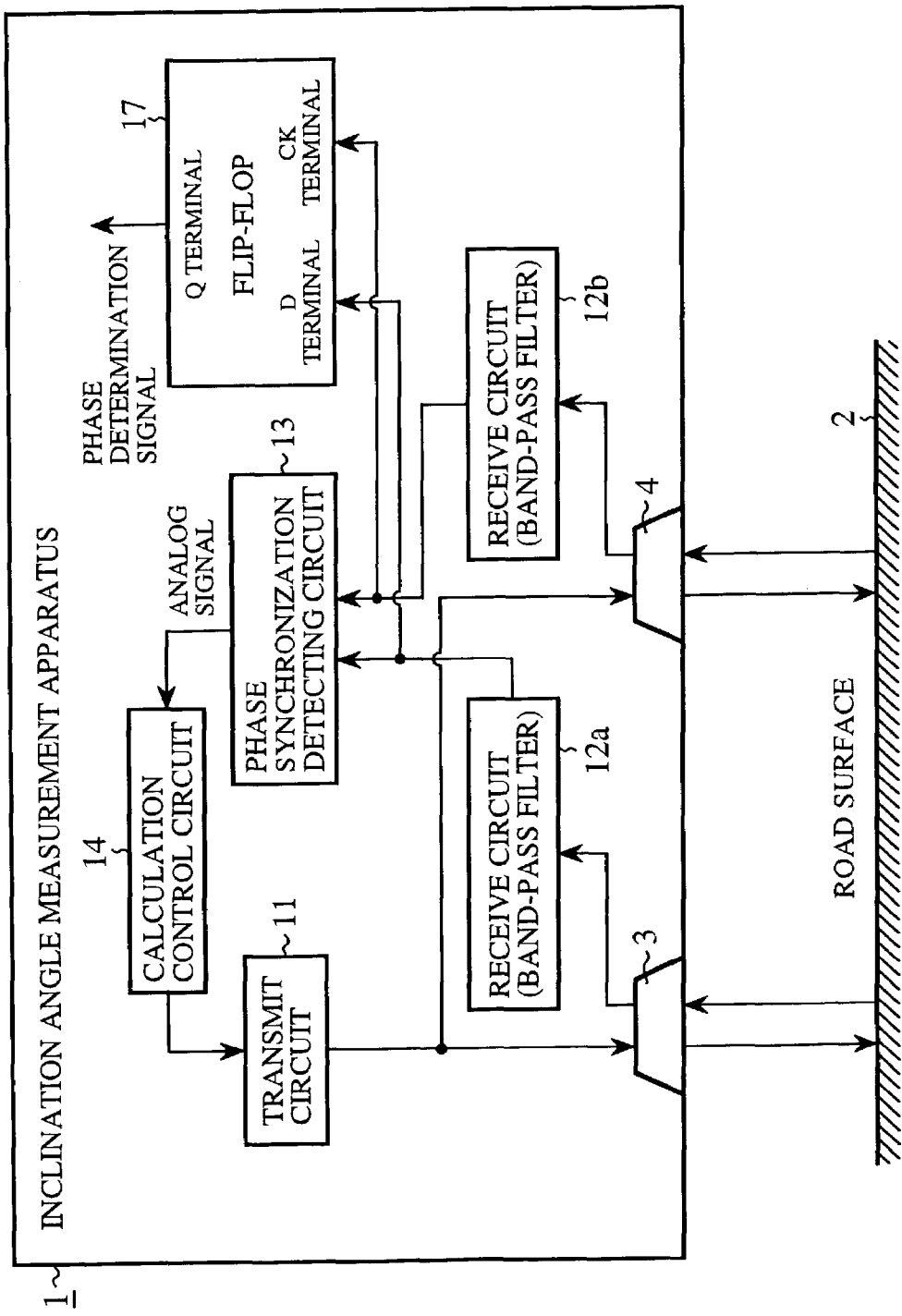
FIG. 40 is a block diagram showing the structure of an inclination angle measurement apparatus according to embodiment 15 of the present invention.

FIG. 40 is a block diagram showing the structure of an inclination angle measurement apparatus according to embodiment 15 of the present invention. In the figure, reference numeral 17 denotes a flip-flop having a D (data) terminal for receiving a fixed-frequency pulse train that passes through a receive circuit 12a, a CK (clock) terminal for receiving a fixed-frequency pulse train that passes through another receive circuit 12b, and a Q (output) terminal for outputting a phase judgment signal indicating a direction in which a vehicle is inclined. The other components included in the inclination angle measurement apparatus according to embodiment 15 are the same as those of the inclination angle measurement apparatus according to embodiment 5 shown in FIG. 13.

The flip-flop 17 shown in FIG. 40 accepts a fixed-frequency pulse train that passes the first receive circuit 12a by way of D terminal and accepts a fixed-frequency pulse train that passes the second receive circuit 12a by way of CK terminal.

Figure 41:
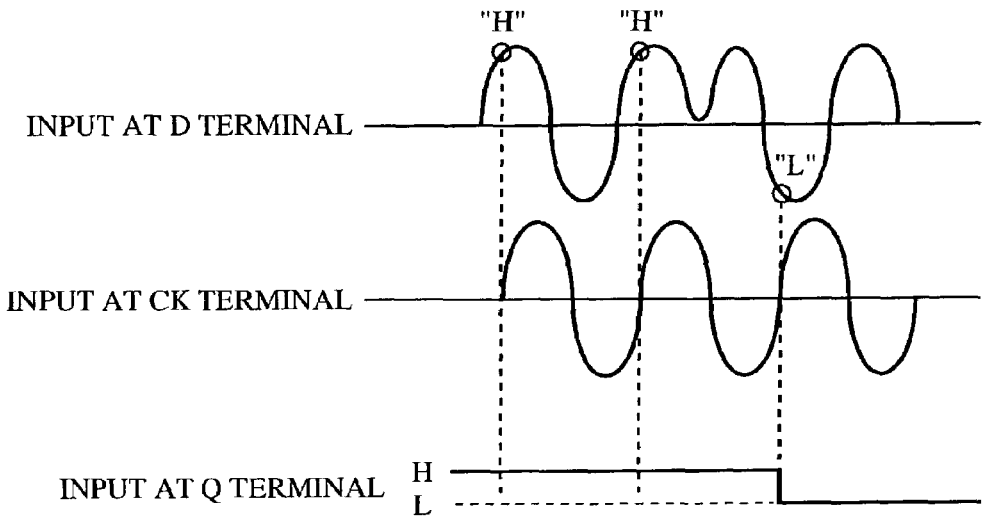
FIG. 41 is a timing chart showing an operation of a flip-flop of the inclination angle measurement apparatus according to embodiment 15.

FIG. 41 is a timing chart showing an operation of the flip-flop 17. As shown in the figure, when detecting a "High" or "Low" at D terminal upon reception of an input via CK terminal, the flip-flop 17 determines that the phase of the fixed-frequency pulse train that passes through the first receive circuit 12a leads or lags the phase of the fixed-frequency pulse train that passes through the second receive circuit 12b and then outputs a phase judgment signal indicating a direction in which the vehicle is inclined via Q output terminal.

Embodiment 16.

In the inclination angle measurement apparatus according to either of above-mentioned embodiments, when a wind is flowing in a space in which an ultrasonic wave sent by each ultrasonic sensor for sending an ultrasonic wave disposed on a vehicle propagates or when the inclination angle measurement apparatus has vibrations or noise caused by the vehicle, a phase shift can occur in the ultrasonic wave and a change can occur in the measurement result of the angle of inclination of the vehicle with respect to a reflective object such as a road surface. In accordance with this embodiment 16, an inclination angle measurement apparatus is so constructed as to cause all ultrasonic sensors included therein to work two or more times and to acquire a plurality of measurement results of the angle of inclination of the vehicle with respect to a reflective object, such as a road surface, and an average of them so as to determine the angle of inclination of the vehicle with respect to the reflective object, in order to reduce changes in the measurement results of the angle of inclination.

Thus the inclination angle measurement apparatus according to embodiment 16 can provide a reliable measurement result of an angle of inclination of a vehicle with respect to a reflective object even if there is a factor that causes measurement errors, such as vibrations or noise caused by the vehicle.

Embodiment 17.

Figure 42:
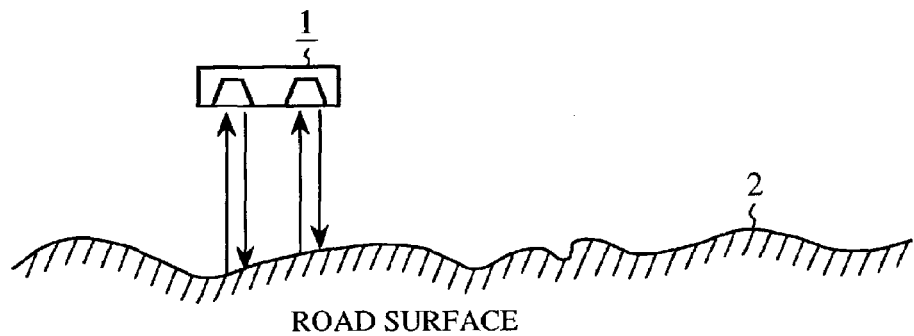
FIG. 42 is an explanatory drawing showing a status of an inclination angle measurement apparatus according to embodiment 17 of the present invention when it measures the angle of inclination of a vehicle when the vehicle'stops.
Figure 43:
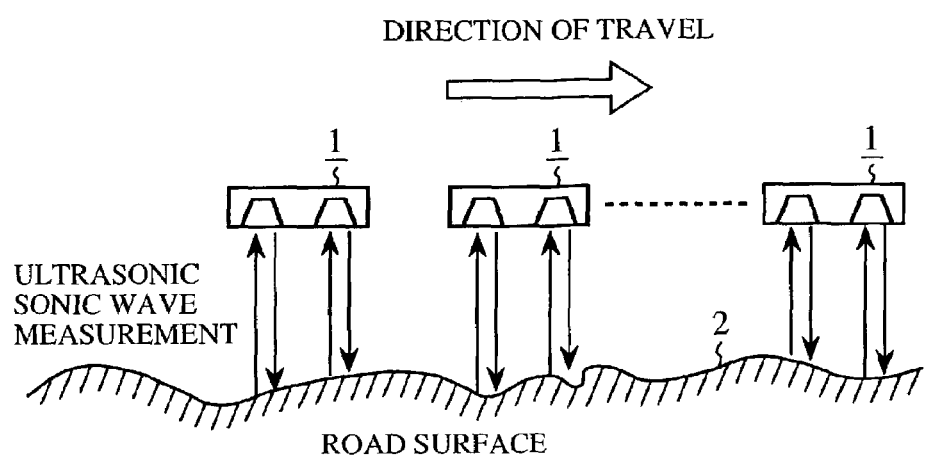
FIG. 43 is an explanatory drawing showing a status of the inclination angle measurement apparatus according to embodiment 17 when it measures the angle of inclination of the vehicle when the vehicle is traveling.

FIG. 42 is an explanatory drawing showing a status of an inclination angle measurement apparatus according to embodiment 17 of the present invention when it measures an angle of inclination of a vehicle when the vehicle'stops, and FIG. 43 is an explanatory drawing showing a status of the inclination angle measurement apparatus according to embodiment 17 when it measures the angle of inclination of the vehicle when the vehicle is traveling.

While the vehicle'stops, as shown in FIG. 42, the inclination angle measurement apparatus may erroneously measure the angle of inclination of the vehicle with respect to a road surface 2 because of road irregularities, water drops on the road surface 2, or the like. On the other hand, while the vehicle is traveling at a high speed, wind noise having a component of a frequency close to that of an ultrasonic wave sent by each ultrasonic sensor is caused and therefore the inclination angle measurement apparatus may erroneously measure the angle of inclination of the vehicle with respect to the road surface 2.

In accordance with this embodiment 17, the inclination angle measurement apparatus is so constructed as to cause all ultrasonic sensors included therein to work to determine the angle of inclination of the vehicle with respect to the road surface 2 while the vehicle is traveling at a low speed, as shown in FIG. 43, so that neither the influence of road irregularities, water drops on the road surface 2, or the like nor the influence of wind noise is exerted upon the measurement of the angle of inclination of the vehicle with respect to the road surface 2. Concretely, the inclination angle measurement apparatus enables all ultrasonic sensors included therein to work while the vehicle is traveling at a speed that falls within a predetermined range, e.g., at a speed greater than 0 km/h and equal to or less than 50 km/h.

Embodiment 18.

Figure 44:
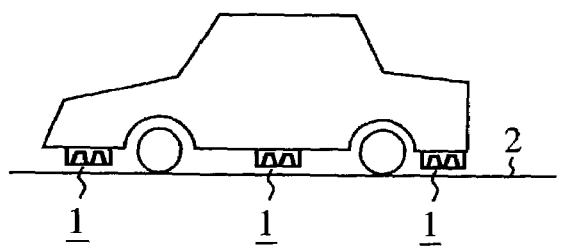
FIG. 44 is an explanatory drawing showing the placement of inclination angle measurement units included in an inclination angle measurement apparatus according to embodiment 18 of the present invention and mounted in a vehicle.

FIG. 44 is an explanatory drawing showing the placement of inclination angle measurement units included in an inclination angle measurement apparatus according to embodiment 18 of the present invention and mounted on a vehicle.

When only one inclination angle measurement apparatus according to either of above-mentioned embodiments is placed on a vehicle, the inclination angle measurement apparatus may erroneously measure an angle of inclination of the vehicle with respect to a road surface 2 because of local road irregularities.

In contrast, the inclination angle measurement apparatus according to this embodiment 18 is provided with a plurality of inclination measurement units arranged at different positions of a vehicle, as shown in FIG. 44, and can acquire a reliable measurement result by averaging angles of inclination of the vehicle, which are acquired by these inclination measurement units.

Embodiment 19.

Figure 45:
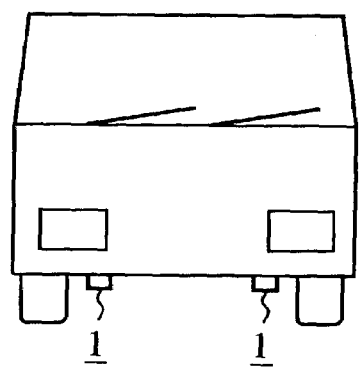
FIG. 45 is an explanatory drawing showing the placement of inclination angle measurement units included in an inclination angle measurement apparatus according to embodiment 19 of the present invention and mounted in a vehicle so that they are arranged along the width of the vehicle.

FIG. 45 is an explanatory drawing showing the placement of inclination angle measurement units included in an inclination angle measurement apparatus according to embodiment 19 of the present invention and mounted on a vehicle so that they are arranged in a line along the width of the vehicle.

As shown in FIG. 45, in the inclination angle measurement apparatus according to this embodiment 19, the plurality of inclination angle measurement units are arranged in a line along the width of the vehicle'so that the inclination angle measurement apparatus can measure an angle of side-to-side inclination of the vehicle with respect to a reflective object such as a road surface. Therefore, the inclination angle measurement apparatus according to this embodiment 19 can detect a roll of the vehicle.

Embodiment 20.

Figure 46:
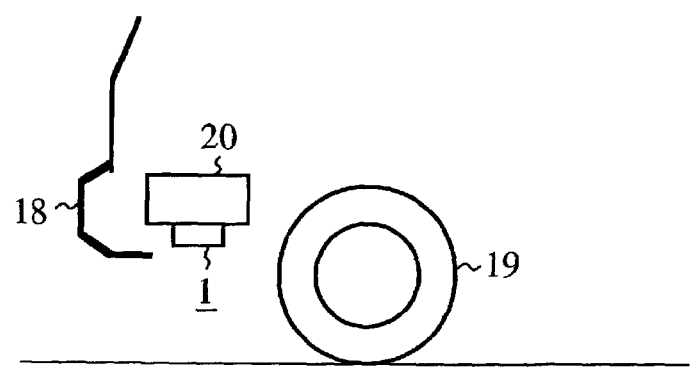
FIG. 46 is an explanatory drawing showing the placement of an inclination angle measurement apparatus according to embodiment 20 of the present invention that is mounted on a vehicle.

FIG. 46 is an explanatory drawing showing the placement of an inclination angle measurement apparatus according to embodiment 18 of the present invention that is mounted on a vehicle. In the figure, reference numeral 18 denotes a front bumper, reference numeral 19 denotes a front wheel, and reference numeral 20 denotes a frame.

As shown in FIG. 46, the inclination angle measurement apparatus 1 is placed behind the front bumper 18 of the vehicle and on a lower surface of the frame 20 located in front of the front wheel 19. As a result, because rain, snow, mud, and so on are prevented from sticking to ultrasonic sensors included in the inclination angle measurement apparatus, the inclination angle measurement apparatus can prevent errors from occurring in a measured angle of inclination of the vehicle with respect to a road surface.

Embodiment 21.

Figure 47:
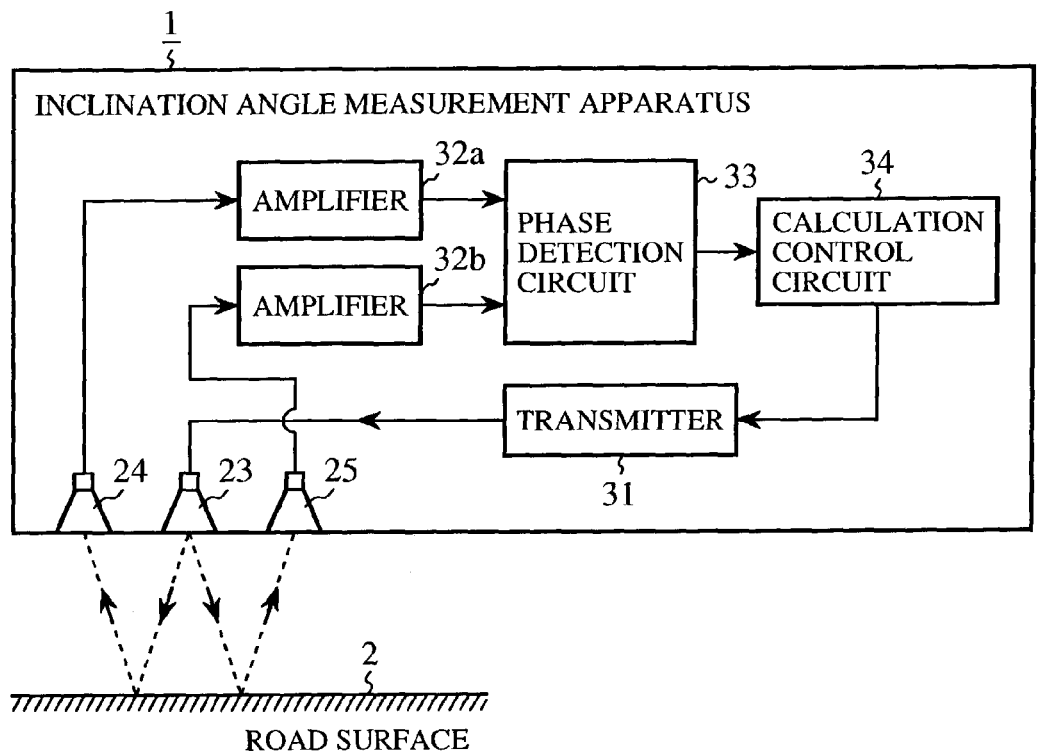
FIG. 47 is a block diagram showing the structure of an inclination angle measurement apparatus according to embodiment 21 of the present invention.

FIG. 47 is a block diagram showing the structure of an inclination angle measurement apparatus according to embodiment 21 of the present invention. In the figure, reference numeral 23 to 25 denote horn antennas each of which can function as a sensor by receiving an electric wave. Each of these horn antennas 23 to 25 can convert an electric fixed-frequency pulse train into an electric wave, and vice versa. In other words, each of these horn antennas 23 to 25 can send and receive an electric wave. In accordance with this embodiment 21, the first horn antenna 23 serves as an antenna for sending an electric wave toward a road surface 2, and each of the second and third horn antennas 24 and 25 serves as an antenna for receiving an electric wave reflected from the road surface 2. The first to third horn antennas 23 to 25 are arranged in a line along the length of a vehicle and are spaced at regular intervals.

In FIG. 47, reference numeral 31 denotes a transmitter for generating and delivering a fixed-frequency pulse train to the first horn antenna 23, reference numerals 32a and 32b denote amplifiers for amplifying fixed-frequency pulse trains into which electric waves received by the second and third horn antennas 24 and 25 are converted, respectively, reference numeral 33 denotes a phase synchronization detecting circuit for comparing the waves of the fixed-frequency pulse trains amplified by the amplifiers 32a and 32b with each other so as to generate a phase difference between the fixed-frequency pulse trains, and reference numeral 34 denotes a calculation control circuit (inclination angle calculating means) for calculating an angle of inclination of the vehicle with respect to the road surface 2 based on the phase difference from the phase synchronization detecting circuit 33, and for controlling the entire inclination angle measurement apparatus 1.

Next, a description will be made as to an operation of the inclination angle measurement apparatus according to embodiment 21 of the present invention. The transmitter 31 shown in FIG. 47 generates a fixed-frequency pulse train having a frequency of 10 GHz, for example, according to an instruction from the calculation control circuit 34 and delivers it to the first horn antenna 23. The first horn antenna 23 converts the fixed-frequency pulse train acquired from the transmitter 31 into an electric wave so as to send the electric wave toward the road surface 2.

The electric wave hits the road surface 2 and is reflected from the road surface 2, and the second and third horn antennas 24 and 25 receive two electric waves reflected from the road surface 2 and generate electric fixed-frequency pulse signals having frequencies corresponding to the two received electric waves, respectively. The amplifiers 32a and 32b amplify the fixed-frequency pulse trains generated by the second and third horn antennas 24 and 25, respectively, and transmit them to the phase synchronization detecting circuit 33. The phase synchronization detecting circuit 33 compares the waveforms of the fixed-frequency pulse trains respectively amplified by the amplifiers 32a and 32b with each other. The reflected electric wave that is received by each of the second and third horn antennas 24 and 25 immediately after starting receiving it has inadequate energy and a waveform of small amplitude. Therefore, the phase synchronization detecting circuit 33 may not be able to recognize the waveforms of the two reflected electric waves immediately after the second and third horn antennas 24 and 25 start receiving the two reflected electric waves, respectively. Therefore, after the two reflected electric waves have adequate signal levels, the phase synchronization detecting circuit 33 compares the waveforms of the fixed-frequency pulse trains respectively amplified by the amplifiers 32a and 32b with each other.

Because the second and third horn antennas 24 and 25 simultaneously receive the two electric waves reflected from the road surface 2 when the vehicle is parallel to the road surface 2, the two electric waves are in phase with each other. In contrast, when the vehicle's front side goes down toward the road surface 2, that is, when the vehicle's front side is inclined toward the road surface 2, the second horn antenna 24 receives the reflected electric wave earlier than the horn antenna 25 receives the reflected electric wave. In other words, the phase of the electric wave received by the second horn antenna 24 leads the phase of the electric wave received by the third horn antenna 25 oppositely, when the vehicle's rear side goes down toward the road surface 2, that is, when the vehicle's rear side is inclined toward the road surface 2, the second horn antenna 24 receives the reflected electric wave later than the third horn antenna 25 receives the reflected electric wave. In other words, the phase of the electric wave received by the second horn antenna 24 lags the phase of the electric wave received by the third horn antenna 25. The phase synchronization detecting circuit 33 determines the phase difference between the phases of the two received electric waves, converts this phase difference into an equivalent analog value, and delivers the analog value to the calculation control circuit 34. The calculation control circuit 34 calculates the angle of inclination of the vehicle with respect to the road surface 2 from the phase difference, the propagation velocity of the electric wave sent by the first horn antenna 23, and the distance between the second horn antenna 24 and the third horn antenna 25.

As mentioned above, in accordance with this embodiment 21, the inclination angle measurement apparatus can accurately measure an angle of inclination of a vehicle with respect to a reflective object, such as a road surface, based on a phase difference between the phases of received electric waves by using the first horn antenna 23 for sending an electric wave toward the reflective object, and the second and third horn antennas 4 and 5 each for receiving an electric wave reflected from the reflective object.

Furthermore, in accordance with this embodiment 21, when the first horn antenna 23 generates and sends an electric wave of a frequency of 10 GHz toward the road surface 2, for example, the electric wave has a wavelength of 30 mm that is longer than those of ultrasonic waves. In this case, the inclination angle measurement apparatus can measure the angle of inclination of the vehicle with respect to the road surface 2 with an enlarged dynamic range of angles of inclination and without being under the influence of irregularities of the road surface 2.

In addition, because electric waves have a large propagation velocity, the inclination angle measurement apparatus according to embodiment 21 is not under the influence of travel of the vehicle. Furthermore, the inclination angle measurement apparatus according to embodiment 21 is not under the influence of wind, rain and snow even when the vehicle is traveling. In addition, while the inclination angle measurement apparatus according to either of above-mentioned embodiments that uses ultrasonic waves is under the influence of temperature, the inclination angle measurement apparatus according to this embodiment 21 is not under the influence of temperature.

As previously mentioned, the inclination angle measurement apparatus according to embodiment 21 of the present invention has a structure similar to that of above-mentioned embodiment 1, in which electric waves are used to measure an angle of inclination of a vehicle with respect to a reflective object such as a road surface. As an alternative, the inclination angle measurement apparatus according to embodiment 21 of the present invention can have a structure similar to that of above-mentioned embodiment 2, 3, 4 or 5, in which electric waves are used to measure an angle of inclination of a vehicle with respect to a reflective object such as a road surface.

Embodiment 22.

Figure 48:
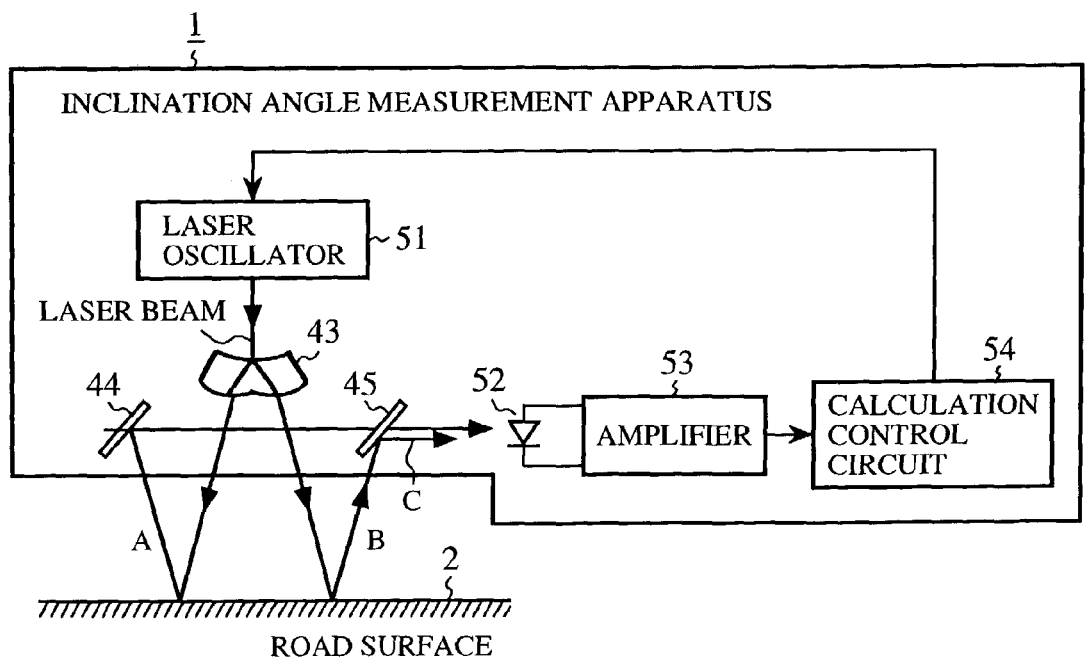
FIG. 48 is a block diagram showing the structure of an inclination angle measurement apparatus according to embodiment 22 of the present invention.

FIG. 48 is a block diagram showing the structure of an inclination angle measurement apparatus according to embodiment 22 of the present invention. In the figure, reference numeral 43 denotes a prism for dividing a laser beam (lightwave) incident thereon into two laser beams, reference numeral 44 denotes a reflector, and reference numeral 45 denotes a half mirror. The prism 43, the reflector 44, and the half mirror 45 are arranged in a line along the length of a vehicle and are spaced at regular intervals.

In FIG. 48, reference numeral 51 denotes a laser oscillator for generating and sending a laser beam of a fixed frequency to the prism 43, reference numeral 52 denotes a light receiving element (sensor) for receiving two laser beams reflected from a road surface 2 and respectively reflected from the reflector 44 and the half mirror 45, and for converting the laser beams that interfere with each other into an electric signal having an amplitude corresponding to the luminance of the received laser beams, reference numeral 53 denotes an amplifier for amplifying the electric signal obtained by the light receiving element 52, and reference numeral 54 denotes a calculation control circuit (inclination angle calculating means) for calculating an angle of inclination of the vehicle with respect to the road surface 2 based on the electric signal amplified by the amplifier 53, and for controlling the entire inclination angle measurement apparatus 1.

Next, a description will be made as to an operation of the inclination angle measurement apparatus according to embodiment 22 of the present invention. The laser oscillator 51 shown in FIG. 48 generates a laser beam of a fixed frequency according to an instruction from the calculation control circuit 54, and sends the laser beam to the prism 43. The prism 43 divides the laser beam incident thereon from the laser oscillator 51 into two laser beams, and sends the two laser beams toward the road surface 2.

The two laser beams from the prism 43 hit the road surface 2 and are reflected from the road surface 2. The two laser beams are further reflected from the reflector 44 and the half mirror 45, respectively. After that, one of the two laser beams from the reflector 44 passes through the half mirror 45, and the two laser beams then travel along the same optical path designated by C and enter the light receiving element 52. The two laser beams incident upon the light receiving element 52 have a phase difference corresponding to the difference between the lengths of optical paths A and B along which the two laser beams from the prism 43 travel, respectively. As a result, interference occurs at the light receiving element 52. For example, when the difference between the lengths of the optical paths A and B is an integral multiple of the wavelength of the laser beams, a bright interference fringe is incident upon the light receiving element 52. In contrast, if the difference between the lengths of the optical paths A and B is an integral multiple and one-half of the wavelength of the laser beams, a dark interference fringe is incident upon the light receiving element 52.

The light receiving element 52 converts the laser beams incident thereupon into an electric signal having an amplitude corresponding to the total luminance of the laser beams, and the amplifier 53 amplifies the electric signal obtained by the light receiving element 52. The calculation control circuit 54 then calculates the angle of inclination of the vehicle with respect to the road surface from the electric signal amplified by the amplifier 53, the propagation velocity of the laser beams, and the distance between the reflector 44 and the half mirror 45.

As mentioned above, in accordance with this embodiment 22, the inclination angle measurement apparatus can accurately measure an angle of inclination of a vehicle with respect to a reflective object, such as a road surface, based on a phase difference between the phases of received laser beams by using the prism 43, the reflector 44, and the half mirror 45.

Furthermore, in accordance with this embodiment 22, because the inclination angle measurement apparatus uses a laser beam having a short wavelength, the inclination angle measurement apparatus can measure the angle of inclination of the vehicle with a high resolution.

In addition, the inclination angle measurement apparatus according to embodiment 22 is not under the influence of wind caused by travel of the vehicle. Furthermore, while the inclination angle measurement apparatus according to either of above-mentioned embodiments 1 to 20 that uses ultrasonic waves is under the influence of temperature, the inclination angle measurement apparatus according to this embodiment 22 is not under the influence of temperature.

As previously mentioned, the inclination angle measurement apparatus according to embodiment 22 of the present invention has a structure similar to that of above-mentioned embodiment 1, in which laser beams are used to measure an angle of inclination of a vehicle with respect to a reflective object such as a road surface. As an alternative, the inclination angle measurement apparatus according to embodiment 22 of the present invention can have a structure similar to that of above-mentioned embodiment 2, 3, 4 or 5, in which laser beams are used to measure an angle of inclination of a vehicle with respect to a reflective object such as a road surface.

As previously mentioned, the inclination angle measurement apparatus according to either of above-mentioned embodiments measures an angle of inclination of a vehicle with respect to a road surface. As an alternative, the inclination angle measurement apparatus can be used for purposes other than previously mentioned. For example, the inclination angle measurement apparatus according to the present invention can be used for controlling the attitude of an aircraft with respect to the ground when it is landing or taking off (e.g., controlling the attitude of the aircraft so that the aircraft has a proper angle of inclination with respect to a runway). The inclination angle measurement apparatus according to the present invention can be alternatively used for controlling the roll of a magnetically-levitated linear motor car that runs on a track while levitating (keeping an angle of side-to-side inclination of the linear motor car with respect to the track constant when it is turning).

Many widely different embodiments of the present invention may be constructed without departing from the spirit and scope of the present invention. ¶@It should be understood that the present invention is not limited to the specific embodiments described in the specification, except as defined in the appended claims.

What is claimed is:

1. An inclination angle measurement apparatus comprising:
 a sending/receiving means for sending a wave toward a reflective object and for receiving two waves reflected from said reflective object; and
 an inclination angle calculating means for calculating an angle of inclination of a moving object with respect to said reflective object based on a phase difference between phases of the two reflected waves,
 wherein said wave sent by said sending/receiving means is an ultrasonic wave, and said two reflected waves are two ultrasonic waves reflected from said reflective object, and
 wherein said sending/receiving means includes a first ultrasonic sensor for sending an ultrasonic wave toward said reflective object and then receiving an ultrasonic wave reflected from said reflective object, and a second ultrasonic sensor disposed at a distance from said first ultrasonic sensor that is much smaller than a distance to said reflective object, for sending an ultrasonic wave in phase with the ultrasonic wave sent by said first ultrasonic sensor toward said reflective object and then receiving an ultrasonic wave reflected from said reflective object, and said inclination angle calculating means calculates the angle of inclination of said moving object with respect to said reflective object based on a phase difference between phases of the two reflected ultrasonic waves received by said first and second ultrasonic sensors.

* * * * *